US011863675B2

United States Patent
Tsai et al.

(10) Patent No.: US 11,863,675 B2
(45) Date of Patent: Jan. 2, 2024

(54) DATA FLOW CONTROL IN DISTRIBUTED COMPUTING SYSTEMS

(71) Applicant: Microsoft Technology Licensing, LLC, Redmond, WA (US)

(72) Inventors: Ariane Belle Tsai, Seattle, WA (US); Aigerim Shintemirova, Seattle, WA (US); Nicole Isis Cranon, Fontana, CA (US); Annalilia Horstmann Cavazos, Kirkland, WA (US); Serguei Vasilyevich Martchenko, Sammamish, WA (US); Yuva Priya Arunkumar, Redmond, WA (US); Andrew Kovalenko, Mill Creek, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/714,514

(22) Filed: Apr. 6, 2022

(65) Prior Publication Data

US 2023/0327875 A1   Oct. 12, 2023

(51) Int. Cl.
*H04L 9/32* (2006.01)
*H04L 9/08* (2006.01)

(52) U.S. Cl.
CPC .......... *H04L 9/3213* (2013.01); *H04L 9/0819* (2013.01); *H04L 9/0838* (2013.01)

(58) Field of Classification Search
USPC ........................................................ 726/9
See application file for complete search history.

(56) References Cited

U.S. PATENT DOCUMENTS

| 7,280,476 | B2 | 10/2007 | Anderson |
| 7,693,975 | B2 | 4/2010 | Sanchez |
| 9,552,550 | B2 | 1/2017 | Vasseur et al. |
| 10,135,740 | B2* | 11/2018 | Yin .......................... H04L 43/16 |
| 11,616,725 | B1* | 3/2023 | Syed ..................... H04L 47/125 370/235 |

(Continued)

FOREIGN PATENT DOCUMENTS

CN    111800829 A    10/2020

OTHER PUBLICATIONS

"Token Bucket", Retrieved From: https://en.wikipedia.org/wiki/Token_bucket#Hierarchical_token_bucket, Jan. 30, 2022, 4 Pages.

(Continued)

*Primary Examiner* — Sanchit K Sarker
(74) *Attorney, Agent, or Firm* — Christopher J. Volkmann; Kelly, Holt & Christenson, PLLC

(57) ABSTRACT

Datacenters or other large-scale distributed computing systems can provide computing resources such as processing power and data storage as computing services accessible to tenants via a computer network. A tenant, such as a corporation, school, or organization, can have multiple users or groups of users with corresponding websites. To facilitate ready access, data relevant to a user, group, or website of a tenant can be stored in a dedicated network location sometimes referred to as a shard. A shard can be a physical and/or logical storage location that contains emails, chats, instant messages, documents, photos, videos, or other types of content items with which the user, group, or website can interact.

20 Claims, 14 Drawing Sheets

(56) References Cited

U.S. PATENT DOCUMENTS

| | | |
|---|---|---|
| 2008/0008094 A1* | 1/2008 | Gilfix .................... H04L 67/125 |
| | | 370/408 |
| 2011/0239226 A1 | 9/2011 | Placanica |
| 2014/0379506 A1 | 12/2014 | Marshall et al. |
| 2015/0332145 A1 | 11/2015 | Vasseur et al. |
| 2017/0026295 A1 | 1/2017 | Yin et al. |
| 2017/0180254 A1* | 6/2017 | Certain .................... G06F 9/00 |
| 2021/0126823 A1* | 4/2021 | Poess .................... H04L 67/306 |
| 2022/0198394 A1* | 6/2022 | Chandra ............. H04L 63/0807 |
| 2023/0237017 A1 | 7/2023 | Jiang et al. |

OTHER PUBLICATIONS

"Treemapping", Retrieved From: https://en.wikipedia.org/wiki/Treemapping, Nov. 25, 2021, 7 Pages.

"Treemaps", Retrieved From: https://developers.google.com/chart/interactive/docs/gallery/treemap, May 3, 2021, 18 Pages.

Carlucci, et al., "Analysis and Design of the Google Congestion Control for Web Real-time Communication", In Proceedings of the 7th International Conference on Multimedia Systems, May 10, 2016, 12 Pages.

"Non Final Office Action Issued in U.S. Appl. No. 17/585,242", dated Mar. 16, 2023, 18 Pages.

"International Search Report and Written Opinion Issued in PCT Application No. PCT/US23/011486", dated Apr. 24, 2023, 11 Pages.

"Final Office Action Issued in U.S. Appl No. 17/585,242", dated Oct. 27, 2023, 20 Pages.

* cited by examiner

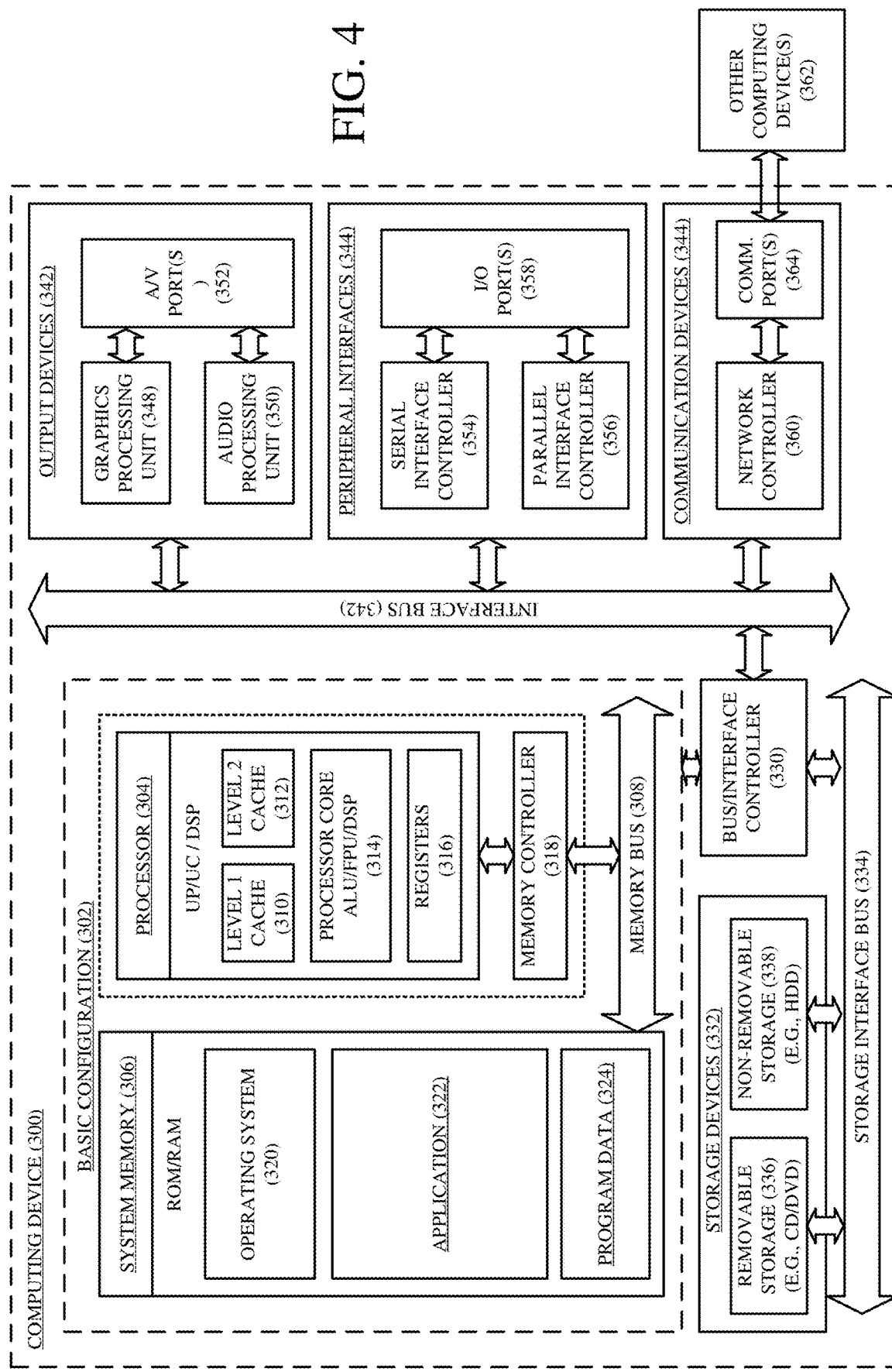

DATA FLOW CONTROL IN DISTRIBUTED COMPUTING SYSTEMS

BACKGROUND

Distributed computing systems typically include routers, switches, bridges, and other types of network devices that interconnect large numbers of servers, network storage devices, or other computing devices. The individual servers can host one or more virtual machines ("VMs"), containers, virtual switches, or other virtualized functions. The virtual machines or containers can facilitate execution of suitable applications for individual users to provide to the users desired cloud services or other suitable computing services.

The discussion above is merely provided for general background information and is not intended to be used as an aid in determining the scope of the claimed subject matter.

SUMMARY

Datacenters or other large-scale distributed computing systems can provide computing resources such as processing power and data storage as computing services accessible to tenants via a computer network. A tenant, such as a corporation, school, or organization, can have multiple users or groups of users with corresponding websites. To facilitate ready access, data relevant to a user, group, or website of a tenant can be stored in a dedicated network location sometimes referred to as a shard. A shard can be a physical and/or logical storage location that contains emails, chats, instant messages, documents, photos, videos, or other types of content items with which the user, group, or website can interact.

Though dedicated shards can facilitate users to efficiently organize storage of data, the distributed nature of the shards is not conducive to system-wide queries across multiple shards, such as queries across multiple shards of a tenant. To facilitate such queries, a system-wide index of content items can be generated by crawling/ingesting data or metadata (referred to herein as file data) of various content items stored in the shards. In certain computing systems, once a content item is generated, modified, or otherwise interacted with in a source shard, a content service can parse the content item and extract various attributes, properties, or file data, such as date created/modified, author, version, storage location, content keywords, etc. from the content item. The content service can then notify an item processor configured to generate/update an entry in a system-wide index of content items. Upon receiving the notification, the item processor can optionally select a subset of the extracted file data of the content item and create an entry in a send queue to transmit the extracted file data (or the subset thereof) to a corresponding partition of the system-wide index. A queue manager can then process the created entry in the send queue and transport, via a link in a computer network, the file data to a receive queue accessible to an index service configured to manage the system-wide index. The index service can then access the extracted file data from the receive queue and store the accessed file data in the partition of the system-wide index.

The foregoing indexing technique, however, may create processing and/or network delays in a distributed computing system. For example, when multiple source shards create large numbers of entries in respective send queues, the queue manager and/or the computer network may be overwhelmed to concurrently process such large numbers of entries. As a result, processing delays at the queue manager and/or congestion in the computer network can cause other computing services in the distributed computing system to be sluggish or even fail. In another example, one or more partitions of the system-wide index may experience processing delays. As a result, retry processing directed toward the one or more partitions can generate high network traffic in the computer network, and thus decreasing usable bandwidth by other computing services.

Several embodiments of the disclosed technology are directed to implementing a flow controller in a distributed computing system to modulate network traffic to update entries at various partitions of a system-wide index of content. The flow controller can be configured as a token issuer to assign multiple tokens for writing to individual partitions of the system-wide index per a time quantum (e.g., a minute, ten minutes, an hour, a day, etc.). A token can include a digital data package that represents a permission to write to a corresponding partition of the system-wide index. In certain embodiments, a token can include a digital object with various data fields configured to contain data representing, for instance, a token identifier, a token number, an assignment date/time, a time to live, or other suitable information. In other embodiments, a token can include other suitable structured or unstructured data representing the foregoing and/or other suitable information. In certain embodiments, the flow controller can be configured to assign the same number of tokens to a partition of the system-wide index per time quantum. In other embodiments, the flow controller can be configured to increase the assigned number of tokens by a fixed amount over a previous time quantum. In further embodiments, the flow controller can be configured to dynamically modulate the assigned numbers of tokens based on observed processing and/or network condition in the computing system, as described in more detail later.

During operation, upon receiving a notification that a content item is generated, modified, or interacted with in the source shard, the item processor can be configured to identify a partition of the system-wide index based on, at least in part, the file data of the content item and transmit, to the flow controller, data representing a request for tokens to write to the identified partition prior to create the entry in the send queue. Upon receiving the request, the flow controller can be configured to determine whether any tokens are available for writing to the identified partition of the system-wide index. In response to determining that tokens are not available, the flow controller can be configured to transmit data representing a denial to the item processor. Upon receiving the denial, the item processor can be configured to refrain from or prevent creating the entry in the send queue. Instead, in certain embodiments, the item processor can be configured to retransmit a token request to the flow controller after pausing for a threshold period (e.g., the time quantum for assigning the tokens or other suitable values). In other embodiments, the item controller can also be configured to skip writing the file data of the content item to the identified partition of the system-wide index after a threshold number of retries have failed.

On the other hand, in response to determining that tokens for writing to the partition of the system-wide index are available, the flow controller can be configured to issue one or more tokens to the item processor and deduct the issued tokens from the available tokens of the partition. In certain examples, the flow controller can be configured to transmit one token per request. In other examples, the flow controller can be configured to transmit multiple tokens that correspond to a data size, item number, or other characteristic of the file data of the content item to be written to the partition of the system-wide index. Only upon receiving the issued token, the item processor can then create an entry in the send queue containing the file data along with the issued token. In turn, the queue manager can then process the created entry by transport the file data of the content item and the issued token to the receive queue accessible to the index service. The index service can then retrieve the file data from the receive queue and store the file data in the identified partition. Upon successfully storing the received file data in the partition, the index service can return the token to the flow controller along with an indication that storage of the file data has been completed successfully.

In certain implementations, the flow controller can be configured to modulate the assigned numbers of tokens per time quantum to the corresponding partition of the system-wide index based on observed processing and/or network conditions in the distributed computing system as reflected in, for instance, the percentage or ratio of returned tokens over issued tokens per time quantum. For example, when one thousand issued tokens are all returned within a time quantum, the flow controller can be configured to increase the assigned number of tokens for the next time quantum based on a high threshold (e.g., 95%) because the one hundred percent return rate exceeds the high threshold to indicate that processing and/or network conditions in the distributed computing system are adequate to process the volume of file data written to the partition. On the other hand, when only five hundred issued tokens are returned out of one thousand issued tokens, the flow controller can be configured to reduce the assigned number of tokens for the next time quantum based on a low threshold (e.g., 80%) because the failure of returning less than the low threshold of the issued tokens indicates processing and/or network traffic delays in the distributed computing system. In other examples, the flow controller can be configured to increase or decrease the assigned numbers of tokens based on other suitable high or low threshold values. In certain implementations, the flow controller can also be configured to continue increasing/decreasing the number of assigned tokens until the percentage or ratio of returned tokens over issued tokens is below/above a corresponding high/low threshold.

The increment or decrement of assigned tokens from one time quantum to another can be a preset or variable value. For example, in certain embodiments, the flow controller can be configured to use the percentage or ratio of returned tokens over issued tokens per time quantum as input to an estimation engine implementing, for instance, a Kalman filter. Based on the percentage or ratio of returned tokens over issued tokens per time quantum, the estimate engine can apply the Kalman filter to generate an estimated number of tokens for the next time quantum. In other embodiments, the estimation engine can also implement Alpha beta filter, inverse variance weighting, covariance intersection, or other suitable types of statistical analysis heuristics.

Several embodiments of the disclosed technology can at least reduce or even prevent processing/network delays in the distributed computing system due to operations of updating various partitions of the system-wide index. By assigning tokens for writing to the individual partitions of the system-wide index, the flow controller can be configured limit the amount of processing and/or network traffic directed to writing file data of content items from multiple source shards to the system-wide index. For example, when one or more source shards have consumed all the tokens assigned to a partition, additional source shards would be prevented from writing to the same partition because the flow controller would reject any additional requests by the additional source shards. Also, when the flow controller observes that the processing/network conditions in the distributed computing system are deteriorating as reflected in a low percentage or ratio of returned tokens over issued tokens, the flow controller can be configured to adjust the assigned number of tokens for the next time quantum to reduce the processing/network traffic directed to updating the system-wide index. Thus, processing and/or network conditions can be improved to facilitate proper execution of additional computing services in the distributed computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4 is a computing device suitable for certain components of the distributed computing system in FIG. 1.

DETAILED DESCRIPTION

Figure 1:
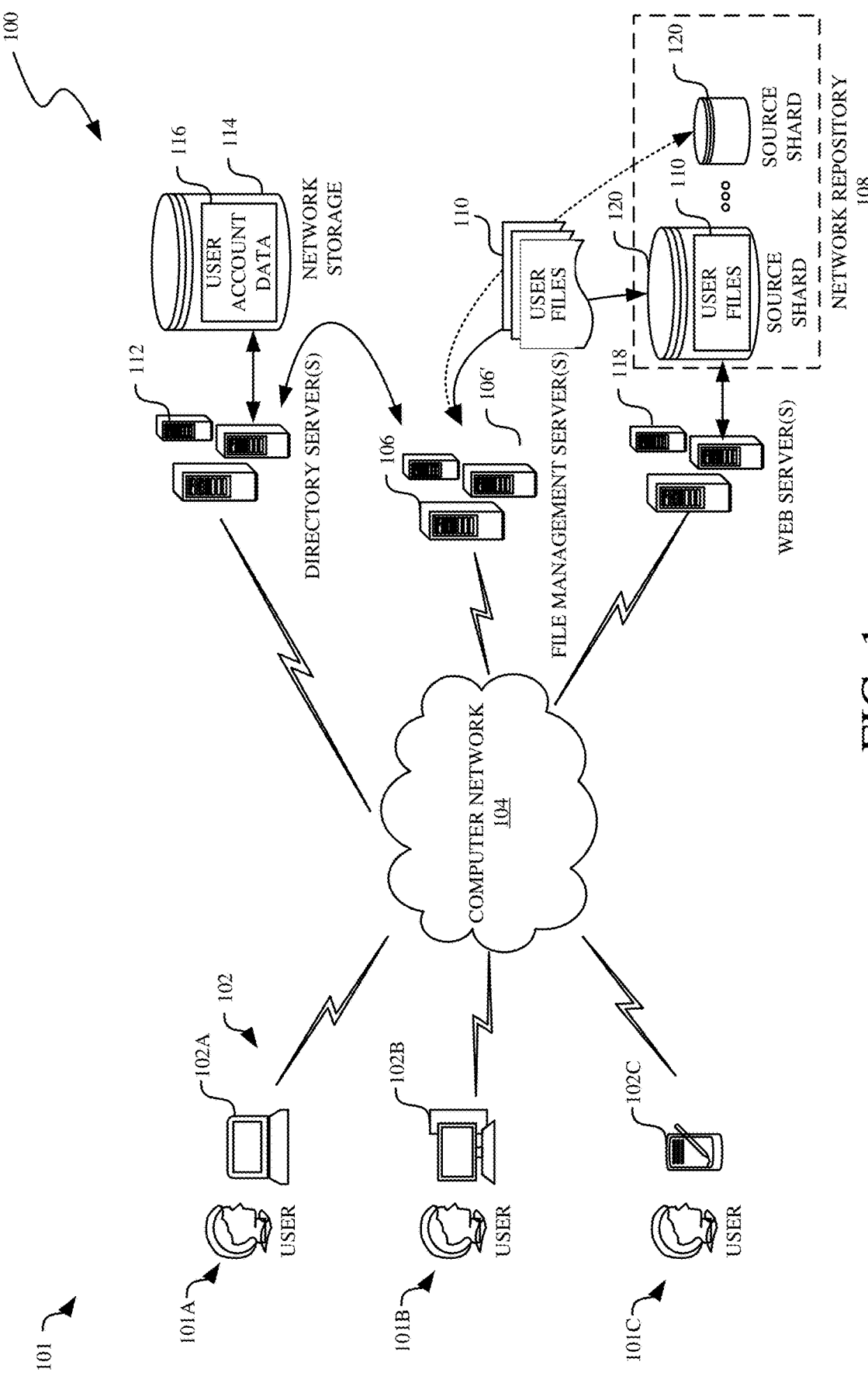
FIG. 1 is a schematic diagram illustrating a distributed computing system implementing data flow control in accordance with embodiments of the disclosed technology.

Certain embodiments of systems, devices, components, modules, routines, data structures, and processes for data flow control in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-4.

As described herein, a distributed computing system can include an interconnected computer network having a plurality of network devices that interconnect a plurality of servers or hosts to one another or to external networks (e.g., the Internet). At least some of the servers or hosts can be in, for example, different datacenters at diverse geographic locations. A network device can include a physical or virtual network device, examples of which include physical or virtual routers, switches, hubs, bridges, load balancers, security gateways, or firewalls. A host can include a computing device configured to implement, for instance, one or more virtual machines, containers, or other suitable virtualized components. For example, a host can include a server having a hypervisor configured to support one or more virtual machines. In another example, a host can include a virtual machine hosting one or more containers or other suitable types of virtual components.

Computer system resource or computing resource can include any physical or virtual component of limited availability within a distributed computing system. Example computing resource can include processor capacities (e.g., CPU), network capacities (e.g., network connections and network bandwidth), and computer readable storage capacities (e.g., memory blocks in solid state devices). Executing an application in a computer system can consume various amount of computing assets. For example, executing an application for voice-over-IP conference can consume an amount of computing and network assets. In another example, executing an application of database management can consume an amount of processor capacities and storage capacities.

A computing service can provide computing resources to users over a computer network such as the Internet. Common examples of computing services include software as a service (SaaS), platform as a service (PaaS), and infrastructure as a service (IaaS). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

FIG. 1 is a schematic diagram illustrating a distributed computing system 100 implementing data flow control in accordance with embodiments of the disclosed technology. As shown in FIG. 1, the distributed computing system 100 can include a computer network 104 interconnecting client devices 102 of users 101, a file management server 106, a directory server 112, and one or more web servers 118. The computer network 104 can include an enterprise intranet, a wide area network, the Internet, or other suitable types of networks.

In certain embodiments, the file management server 106, the directory server 112, and the web servers 118 can each include one or more interconnected computer servers, as shown in FIG. 1. In other embodiments, the foregoing components of the distributed computing system 100 can each include a cloud-based service hosted on one or more remote computing facilities such as datacenters. In further embodiments, certain components (e.g., the web servers 118) may be omitted from the distributed computing system 100 in FIG. 1, and the corresponding functions can be provided by external computing systems (not shown).

The distributed computing system 100 can also include a network storage 114 operatively coupled to the directory server 112. The network storage 114 can be configured to store records of user account data 116. In certain embodiments, example user account data 116 include usernames, user locations, user alias, user pictures, user contact information, access control credentials, and/or other suitable types of user information. In other embodiments, the user account data 116 can also include other suitable information.

As shown in FIG. 1, the distributed computing system 100 can further include a network repository 108 operatively coupled to the web servers 118 and. The network repository 108 can be configured to store records of user files 110 accessible to the users 101 via the client devices 102 and the computer network 104. The user files 110 can include any suitable application data created, modified, used, interacted with, or otherwise accessible to the users 101. For instance, examples of the user files 110 can include documents, images, videos, chats, emails, calendar items, or other suitable types of digital objects.

As illustrated in FIG. 1, the network repository 108 can include multiple storage locations referred to as source shards 120. The source shards 120 can be physically and/or logically separate from one another. Each source shard 120 can be configured to contain user files 110 for individual users 101, user groups, or websites of a tenant. For example, documents, calendar items, chats, and emails of a website can be stored in a single source shard 120. In another example, documents of a user 101 can be stored in a different source shard 120. Though only two source shards 120 are illustrated in FIG. 1, in other embodiments, the distributed computing system 100 can include hundreds, thousands, even millions of source shards 120.

Even though particular components and associated arrangements of the distributed computing system 100 are shown in FIG. 1, in other embodiments, the distributed computing system 100 can include additional and/or different components. For example, in certain embodiments, the network repository 108 and the network storage 114 can be combined into a single physical or logical storage space accessible via the computer network 104. In further embodiments, the distributed computing system 100 can also include additional servers, network storages, load balancers, or other suitable components.

The client devices 102 can individually include a computing device that facilitates access to the source shards 120 of the network repository 108 via the computer network 104 by the users 101. For example, in the illustrated embodiment, the first client device 102a is a laptop computer. The second client device 102b is a desktop computer. The third client device 102c is a tablet computer. In other embodiments, the client devices 102 can also include smartphones, tablets, or other suitable computing devices. Even though three users 101a-101c are shown in FIG. 1 for illustration purposes, in other embodiments, the distributed computing system 100 can facilitate any suitable number of users 101 access to the network repository 108 via the computer network 104.

The web servers 118 can be configured to provide the user files 110 to the users 101 via the computer network 104. For example, in one embodiment, the web servers 118 can be configured to provide an enterprise internal website that allows the users 101 to securely exchange messages (e.g., chats or emails) and to cooperate on performing tasks or executing a project. In other embodiments, the web servers 118 can also be configured to provide a social network website that allows the users 101 to post user files 110, comment on one another's user files 110, share and/or recommend user files 110 with additional users 101, or perform other suitable actions. In certain embodiments, the web servers 118 can also be configured to receive and store the user files 110 in the network repository 108 in cooperation with the file management server 106. In other embodiments, the distributed computing system 100 can further include a database server (not shown) or other suitable components configured to perform the foregoing functions.

The directory server 112 can be configured to maintain the user account data 116 for the users 101 and facilitate various account related operations, such as access control, data queries, etc. For example, in one embodiment, the directory server 112 can implement access control policies such that certain class, type, category, or other suitable grouping of the user files 110 can be accessible to specified users 101. In another embodiment, the directory server 112 can also be configured to share with various file management servers 106 data representing the geographic locations of the source shards 120 corresponding to the various users 101.

The file management server 106 can be configured to facilitate efficient storage, management, and retrieval of the user files 110 by using the source shards 120 corresponding to the users 101. For example, the file management server 106 can be configured to receive, store, retrieve, and update one or more of the user files 110 based on input from the users 101. In other examples, the file management server 106 can also be configured to track versions of a single user file 110 or perform other suitable operations on the user files 110.

To facilitate ready access, data relevant to a user, group, or website can be stored in a dedicated source shard 120. Though dedicated source shards 120 can facilitate users 101 to efficiently organize storage of user files 110, the distributed nature of the source shards 120 is not conducive to tenant-wide queries across multiple source shards 120. To facilitate such queries, a system-wide index (e.g., a tenant-wide index) of user files 110 can be generated by crawling/ingesting data or metadata of various content items (referred to herein as file data) stored in the source shards 110. However, such indexing may create processing and/or network delays in a distributed computing system. For example, when multiple source shards 120 create large numbers of updates to the system-wide index, the computer network 104 may be overwhelmed to simultaneously process such large numbers of updates. As a result, congestion in the computer network 140 can cause other computing services in the distributed computing system 100 to be sluggish or even fail.

Several embodiments of the disclosed technology are directed to implementing a flow controller 136 (shown in FIG. 2A) in the distributed computing system 100 to modulate network traffic to various partitions of a distributed index such as a system-wide index 121 (shown in FIG. 2A) of user files 110. By assigning tokens for writing to individual partitions of the system-wide index 121, the flow controller 136 can be configured as a token issuer to limit the amount of processing and/or network traffic directed to writing data to the system-wide index 121. Also, when the flow controller 136 observes that the processing/network conditions in the distributed computing system 100 are deteriorating, the flow controller 136 can be configured to reduce the processing/network traffic directed to updating the system-wide index 121 from one time quantum to a subsequent time quantum. Thus, processing and/or network conditions can be improved to facilitate proper execution of additional computing services in the distributed computing system 100, as described in more detail below with reference to FIGS. 2A-2D.

Figure 2A:
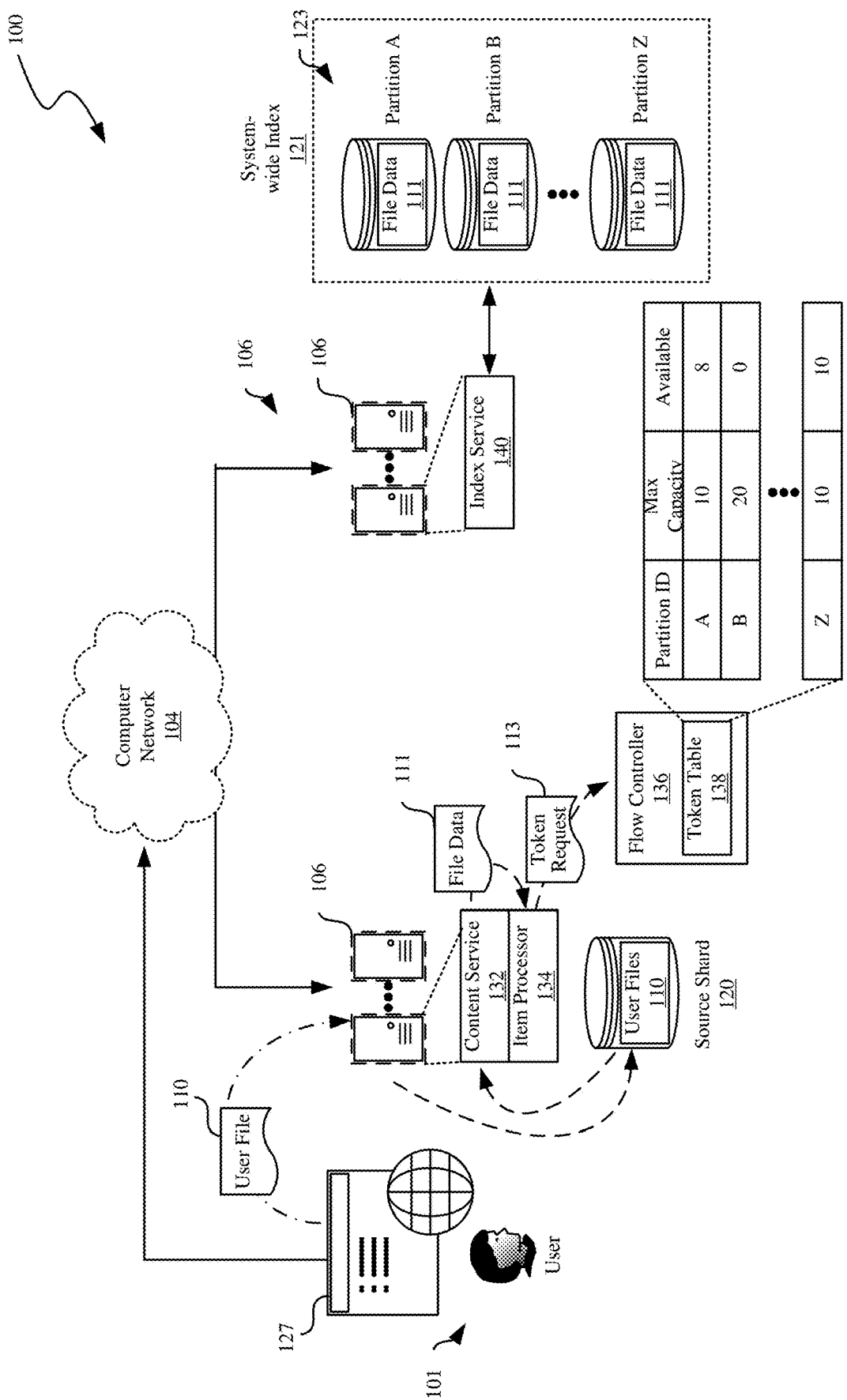
FIGS. 2A-2D are schematic diagrams illustrating example operations of the distributed computing system 100 in FIG. 1 for federating data during query time in accordance with embodiments of the disclosed technology.

As shown in FIG. 2A, in certain embodiments, the file management servers 106 can individually execute suitable instructions to provide a content service 132, an item processor 134, a flow controller 136, and an index service 140. In other embodiments, the foregoing computing services may be provided by the directory server 112, the web server 118, or other suitable servers (not shown) in the distributed computing system 100. The content service 132 can be configured to manage user interactions with content items such as user files 110. For example, the file management server 106 can be configured to facilitate the user 101 to create, modify, or interact with a user file 110. The file management server 106 can then store the user file 110 in the source shard 120.

Upon detecting that the user file 110 in the source shard 120 has been created, modified, or interacted with, the content service 132 can be configured to parse the user file 110 and extract attributes, properties, or file data 111, such as date created/modified, author, version, storage location, content keywords, etc. from the user file 110. The content service 132 can then be configured to notify the item processor 134 that is configured to generate/update an entry in the system-wide index 121. As shown in FIG. 2A, the system-wide index 121 can include multiple partitions 123 each containing file data 111 of corresponding user files 110. In the illustrated example, the system-wide index 121 is divided into partition A to partition Z. In other examples, the system-wide index 121 can be divided into partitions 123 in other suitable fashions. In FIG. 2A and in other figures herein, partitions 123 are shown as separate physical storage units for illustration purposes. In other embodiments, one or more partitions 123 of the system-wide index 121 can include a logical collection of multiple physical storage units or sub-units (not shown).

Upon receiving the notification of incoming file data 111, the item processor 134 can be configured to optionally select a subset of the extracted file data 111 of the user file 110 and identify a partition 123 of the system-wide index 121 for storing the file data 111. In certain embodiments, the item processor 134 can be configured to identify the partition 123 by hashing at least a portion of the file data 111, analyzing metadata included in the file data 111, or in other suitable ways. Upon identifying the partition 123, the item process 134 can be configured to transmit data representing a token request 113 to the flow controller 136 prior to initiating transmission of the file data 111 to the identified partition 123.

The flow controller 136 can be configured to issue or reject the token request 113 by managing an accounting of available tokens for each partition 123 of the system-wide index 121 using, for instance, a token table 138. For example, as shown in FIG. 2A, the token table 138 can include columns corresponding to partition ID, max capacity, and available tokens and rows corresponding to each partition 123. Thus, in the illustrated example, partition A has a max capacity of ten tokens while eight tokens are currently available. Partition B has a max capacity of twenty tokens while zero are currently available. Partition Z has a max capacity of ten tokens that are all available. In other examples, the flow controller 136 can be configured to manage the accounting of available tokens using a database, a spreadsheet, or other suitable data structures.

The flow controller 136 can be configured to assign multiple tokens for writing to individual partitions 123 of the system-wide index 121 per a time quantum (e.g., a minute, ten minutes, an hour, a day, etc.). A token can include a digital data package that represents a permission to write to a partition 123 of the system-wide index 121. In certain embodiments, a token can include a digital object with various data fields configured to contain data representing, for instance, a token identifier, a token number, an assignment date/time, a time to live, or other suitable information. In other embodiments, a token can include other suitable structured or unstructured data representing the foregoing and/or other suitable information.

In certain embodiments, the flow controller 136 can be configured to assign the same number of tokens to a partition 123 (e.g., partition A) of the system-wide index 121 per time quantum. In other embodiments, the flow controller 136 can be configured to increase the assigned number of tokens by a fixed amount over a previous time quantum. In further embodiments, the flow controller 136 can be configured to dynamically modulate the assigned number of tokens based on observed processing/network condition in the computing system, as described in more detail below with reference to FIG. 2D.

Figure 2B:
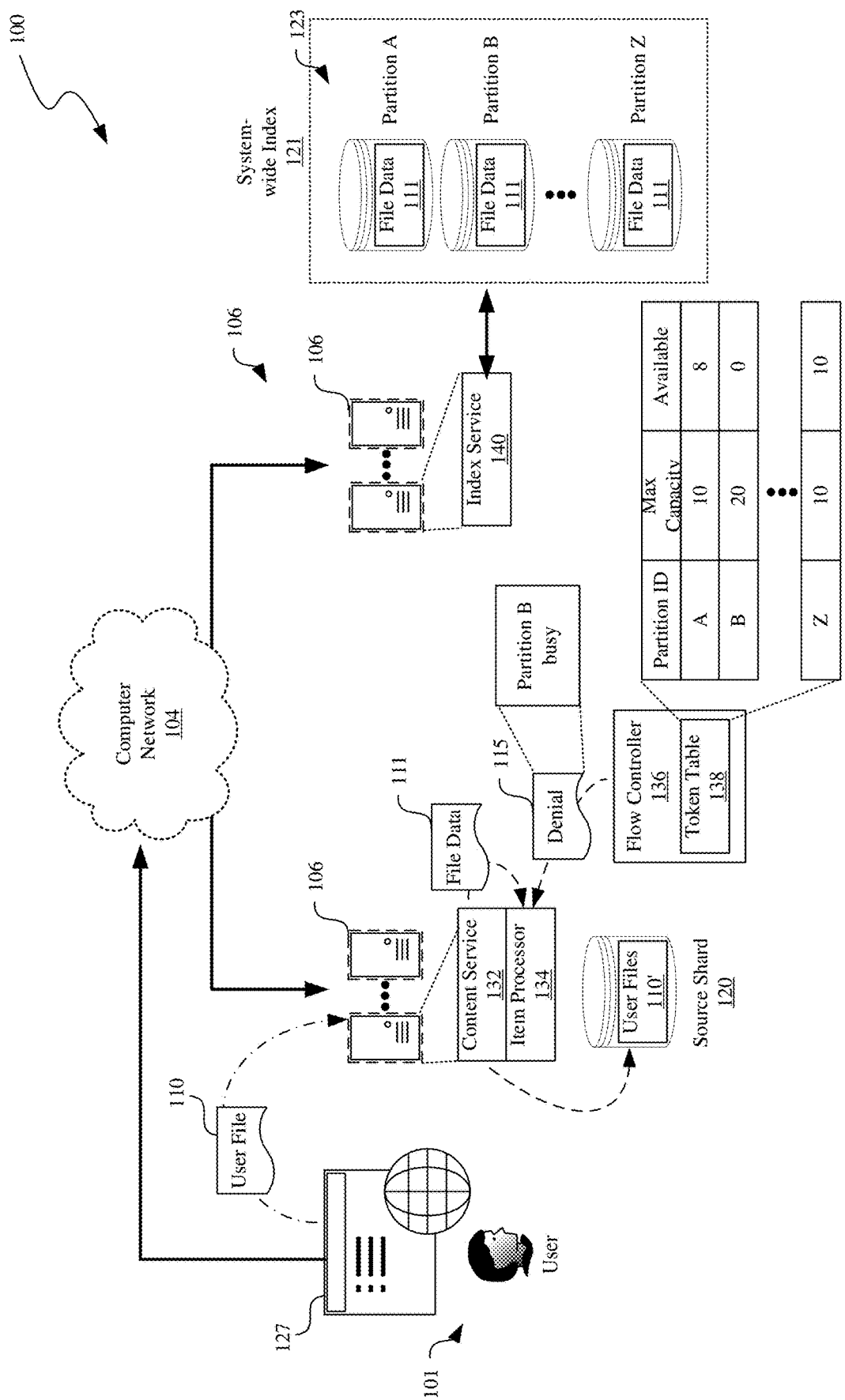

As shown in FIG. 2A, upon receiving the token request 113, the flow controller 136 can be configured to determine whether any tokens are available for writing to the identified partition 123 of the system-wide index 121. In response to determining that tokens are not available, for instance, partition B has zero available tokens, the flow controller 136 can be configured to transmit data representing a denial 115 to the item processor 134, as shown in FIG. 2B. The denial 115 can include data indicating that partition B is busy or other unavailable. Upon receiving the denial 115, the item processor 134 can be configured to refrain from writing to the identified partition 123. Instead, in certain embodiments, the item processor 134 can be configured to retransmit a token request (not shown) to the flow controller 136 after a threshold period (e.g., the time quantum for assigning the tokens or other suitable values). In other embodiments, the item controller 134 can also be configured to skip writing the file data 111 to the identified partition 123 of the system-wide index 121 after a threshold number of retries have failed.

Figure 2C:
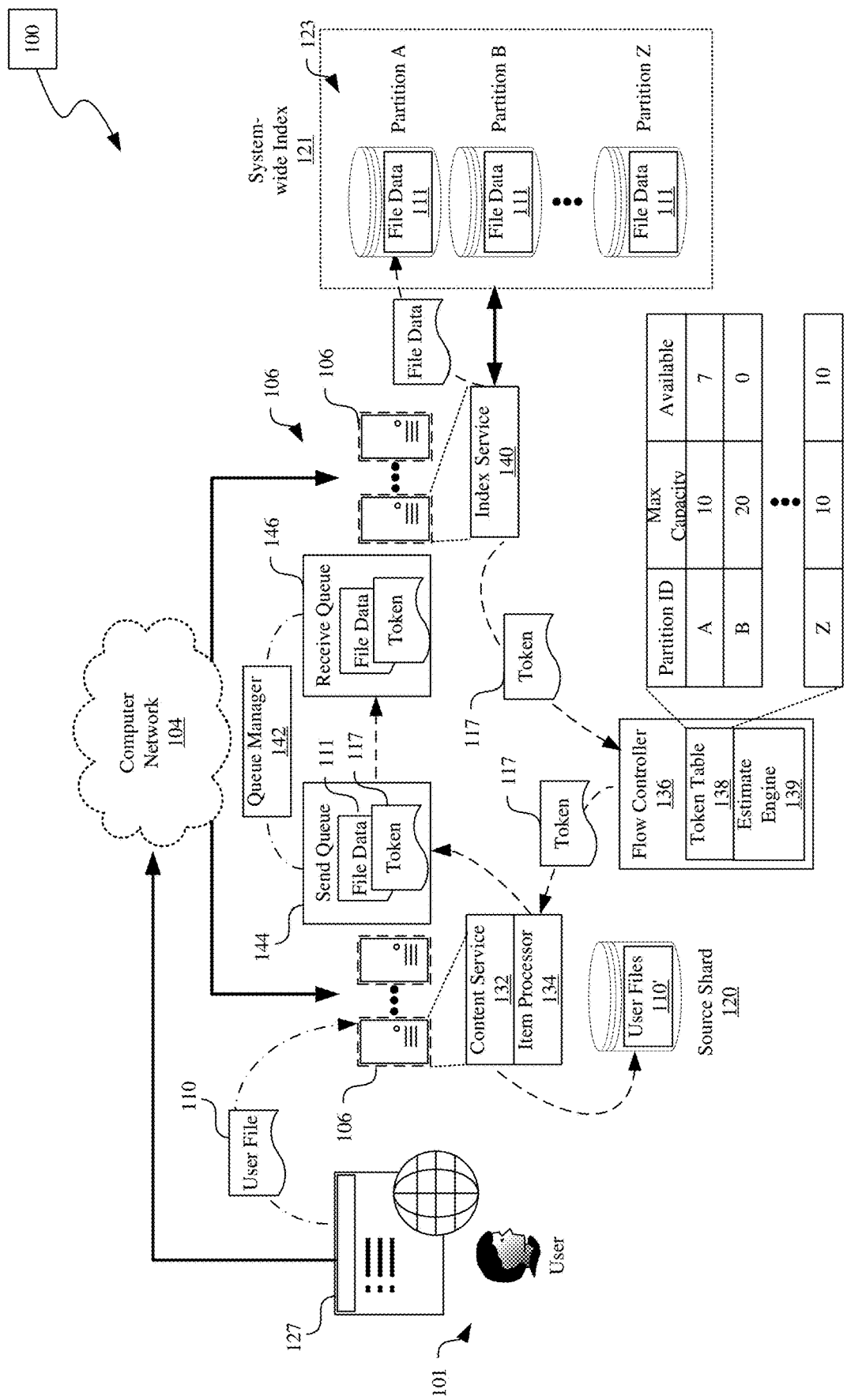

On the other hand, as shown in FIG. 2C, in response to determining that tokens for writing to the partition 123 of the system-wide index 121 are available, for instance, partition A has eight available tokens, the flow controller 136 can be configured to issue one or more tokens 117 to the item processor 134 and deduct the issued tokens from the available tokens in the token table 138. In certain examples, the flow controller 136 can be configured to transmit one token per request. Thus, as shown in FIG. 2C, the available number of tokens for partition A is deducted by one. In other examples, the flow controller 136 can be configured to transmit multiple tokens that correspond to a data size, item number, or other characteristic of the file data 111 to be written to the partition 123 of the system-wide index 121.

Upon receiving the issued token 117, the item processor 134 can be configured to transmit the file data 111 to the identified partition 123. For example, in certain embodiments, the item processor 134 can be configured to create an entry containing the file data 111 in a send queue 144 along with the token 117. In turn, a queue manager 142 can be configured to process the created entry by transport the file data 111 and the issued token 117 to a receive queue 146 accessible to the index service 140. The index service 140 can then retrieve the file data 111 from the receive queue 146 and store the file data 111 in the identified partition 123, e.g., partition A, as illustrated in FIG. 2C. Upon successfully storing the received file data 111 in the partition 123, the index service 140 can be configured to return the token 117 received along with the file data 111 to the flow controller 136 along with an indication that storage of the file data 111 has been completed successfully.

In certain implementations, the flow controller 136 can be configured to modulate the assigned number of tokens 117 per time quantum to a partition 123 of the system-wide index 121 based on observed processing/network conditions in the distributed computing system 100 as reflected in a percentage or ratio of returned tokens 117 over issued tokens 117 per time quantum. For example, when one thousand issued tokens 117 are all returned within a current time quantum, the flow controller 136 can be configured to increase the assigned number of tokens 117 to a partition 123 for the next time quantum at or near expiration of the current time quantum based on a high threshold (e.g., 95%) because the one hundred percent return rate exceeds the high threshold to indicate that processing and/or network conditions in the distributed computing system 100 are adequate to process the volume of file data 111 written to the partition 123. On the other hand, when only five hundred or other suitable numbers of issued tokens are returned out of one thousand issued tokens, the flow controller 136 can be configured to reduce the assigned number of tokens 117 for the next time quantum at or near expiration of the current time quantum based on a low threshold (e.g., 80%) because the failure of returning less than the low threshold of the issued tokens 117 indicates processing and/or network traffic delays in the distributed computing system 100. In other embodiments, the flow controller can be configured to increase the assigned number of tokens by a fixed amount over a previous time quantum. In certain implementations, the flow controller 136 can also be configured to continue increasing/decreasing the number of assigned tokens until the percentage or ratio of returned tokens over issued tokens is below/above a corresponding high/low threshold.

Figure 2D:
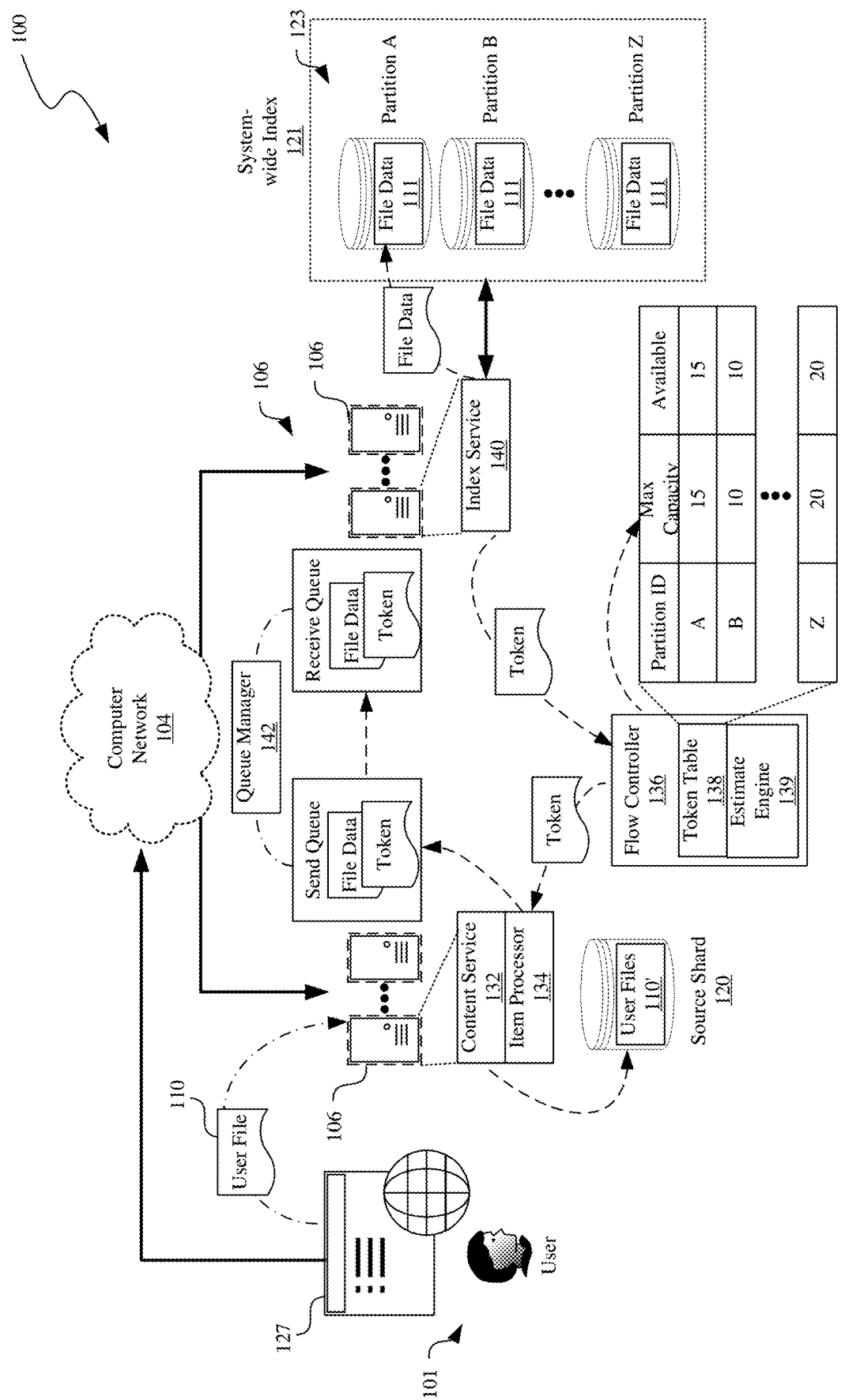

The increment or decrement of assigned tokens from one time quantum to another can be a preset or variable value. For example, in certain embodiments, the flow controller 136 can be configured to use the percentage or ratio of returned tokens over issued tokens per time quantum as input to an estimation engine 139 implementing, for instance, a Kalman filter. Based on the percentage or ratio of returned tokens over issued tokens per time quantum, the estimate engine 139 can apply the Kalman filter to generate an estimated number of tokens 117 for the next time quantum. In other embodiments, the estimation engine 139 can also implement Alpha beta filter, inverse variance weighting, covariance intersection, or other suitable types of statistical analysis heuristics. As shown in FIG. 2D, at or near expiration of the current time quantum, for the next time quantum, the flow controller 136 can assign fifteen, ten, and twenty tokens 117 to partitions A, B, and Z, respectively based on the percentage or ratio of returned tokens over issued tokens per time quantum for each of the partitions 123.

Several embodiments of the disclosed technology can at least reduce or even prevent processing/network delays in the distributed computing system 100 due to operations of updating various partitions 123 of the system-wide index 121. By assigning tokens for writing to individual partitions 123 of the system-wide index 121, the flow controller 136 can be configured limit the amount of processing and/or network traffic directed to writing file data 111 to the system-wide index 123. For example, when one or more source shards 120 have consumed all or most of the tokens assigned to a partition during a time quantum, additional source shards 120 would be prevented from writing to the same partition 123 because the flow controller 136 would reject any additional token requests 113 by the additional source shards 120. Also, when the flow controller 136 observes that the processing/network conditions in the distributed computing system 100 are deteriorating as reflected in a low percentage or ratio of returned tokens over issued tokens, the flow controller 136 can be configured to adjust the assigned number of tokens 117 for the next time quantum to reduce the processing/network traffic directed to updating the system-wide index 121. Thus, processing and/or network conditions can be improved to facilitate proper execution of additional computing services in the distributed computing system 100.

FIGS. 3A-3D are flowcharts illustrating processes of data flow control in accordance with embodiments of the disclosed technology. Though embodiments of the processes are described below in the context of the distributed computing system 100 of FIGS. 1-2D, in other embodiments, the processes may be implemented in computing systems with additional and/or different components.

Figure 3A:
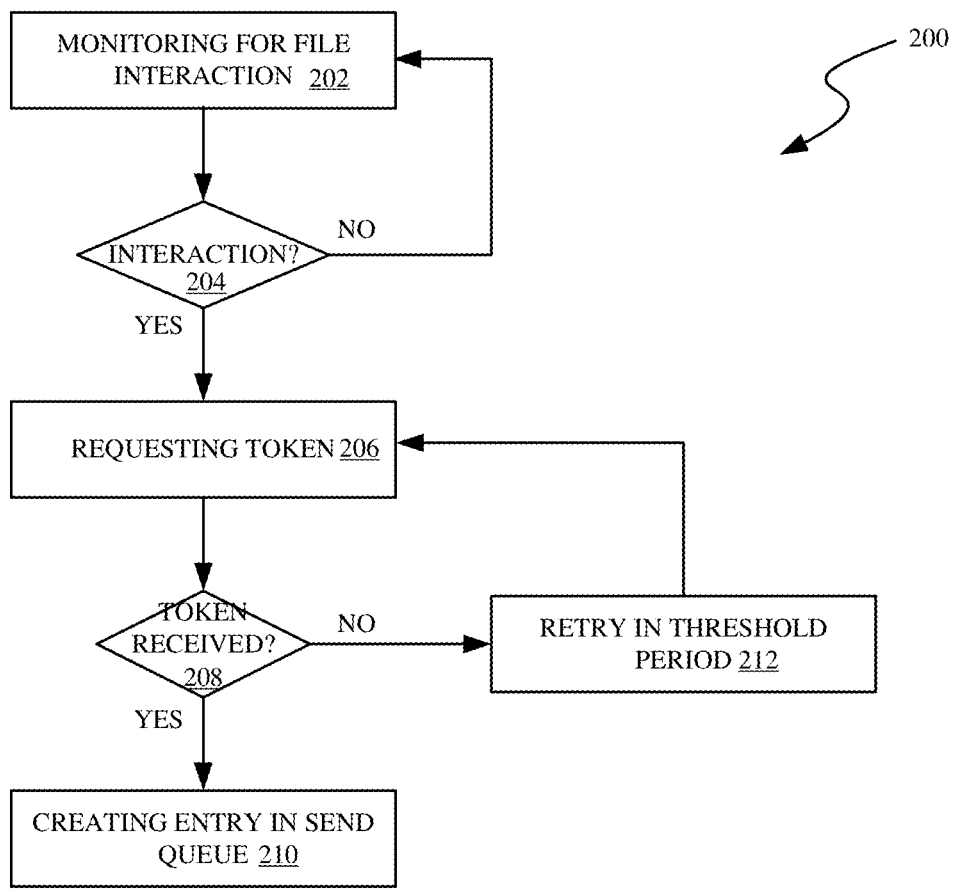
FIGS. 3A-3D are flowcharts illustrating processes of data flow control in accordance with embodiments of the disclosed technology.

As shown in FIG. 3A, a process 200 can include monitoring for file interactions at stage 202. In certain embodiments, file interactions can include a user 101 (FIG. 1) creating, modifying, commenting, reading, sharing, or otherwise accessing a user file 110 (FIG. 1). In other embodiments, file interactions can also include other suitable user actions on the user file 110. The process 200 can then include a decision stage 204 to determine whether a file interaction is detected. In certain embodiments, a file interaction is detected when an indication from, for instance, the content service 132 (FIG. 2A) is received. In other embodiments, a file interaction is detected by scanning one or more user files 110 in a source shard 120 (FIG. 1) or via other suitable means. In response to determining that a file interaction is not detected, the process 200 reverts to monitoring for file interaction at stage 202. Otherwise, the process 200 proceeds to requesting a token for updating the system-wide index 121 (FIG. 2A) at stage 206. Example of requesting and issuing tokens are described in more detail above with reference to FIG. 2B. The process 200 can then include another decision stage 208 to determine whether a token for updating the system-wide index is received. In response to determining that a token is not received within a threshold period or a denial for token is received, the process 200 proceeds to retrying requesting for a token in a threshold period at stage 212. Otherwise, the process 200 proceeds to creating an entry in a send queue for transmitting file data to the system-wide index at stage 210.

Figure 3B:
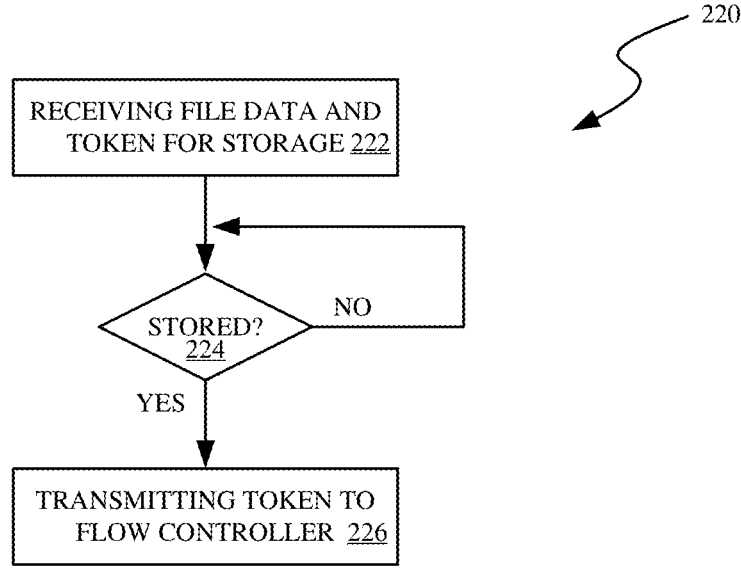

As shown in FIG. 3B, another process 220 can include receiving file data for updating the system-wide index and a token at stage 222. The process 220 can then include a decision stage 224 to determine whether the received file data is stored successfully to update the system-wide index. In response to determining that the file data is stored successfully, the process 220 can proceed to transmitting the received token to the flow controller 136 (FIG. 2A). Otherwise, the process 220 can pause for a threshold period before reverting to determining whether the received file data is stored successfully at stage 224.

Figure 3C:
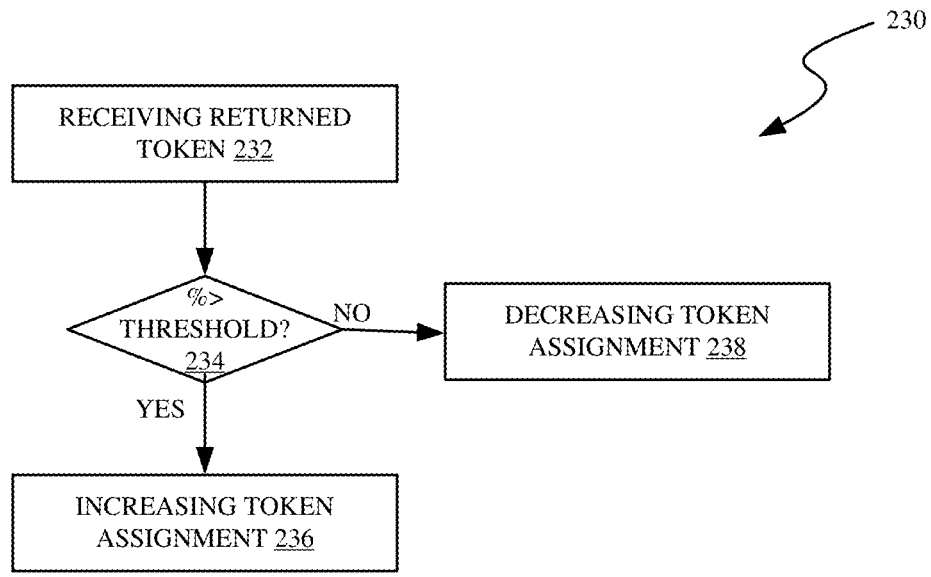
Figure 3D:
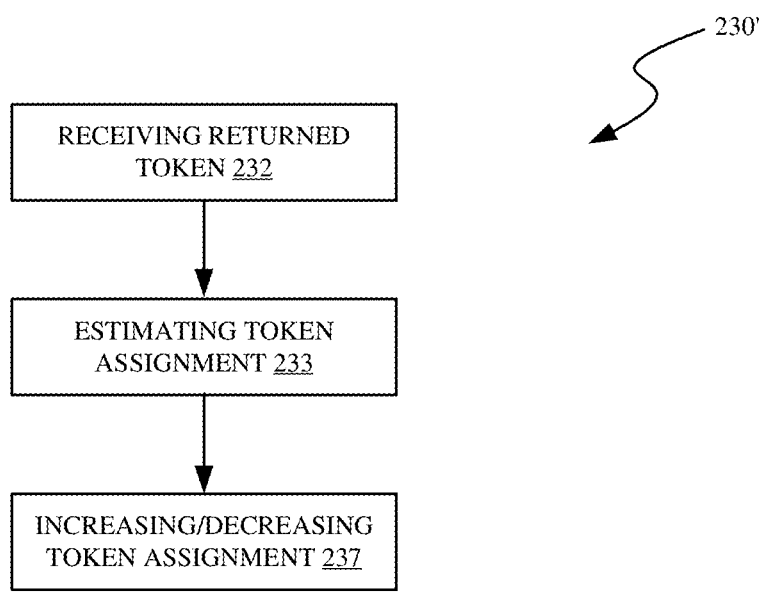

As shown in FIG. 3C, another process 230 can include receiving a token returned to, for instance, the flow controller 136 (FIG. 2A) from the index service 140 (FIG. 2A) at stage 232. The process 230 can then include, at or near expiration of a time quantum, a decision stage 234 to determine whether a percentage or ratio of returned tokens over issued tokens is above a threshold. In response to determining that the percentage or ratio is above the threshold, the process 230 can proceed to increasing token assignment for the next time quantum at stage 236. Otherwise, the process 230 can proceed to decreasing token assignment for the next time quantum at stage 238. The token assignment can be increased or decreased in various ways, examples of which are described above with reference to FIGS. 2C and 2D. Alternatively, as shown in FIG. 3D, instead of the decision stage 234, the process 230' can include a stage 233 at which token assignment is estimated based on a percentage or ratio of returned tokens over issued tokens, as described in more detail above with reference to FIGS. 2C and 2D. The process 230' can proceed to increasing/decreasing the token assignment for the next time quantum at stage 237 based on the estimated token assignment from stage 233.

FIG. 4 is a computing device 300 suitable for certain components of the distributed computing system 100 in FIG. 1. For example, the computing device 300 can be suitable for the client devices 102, file management server 106, the directory server 112, or the web server 118 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Figure 8:
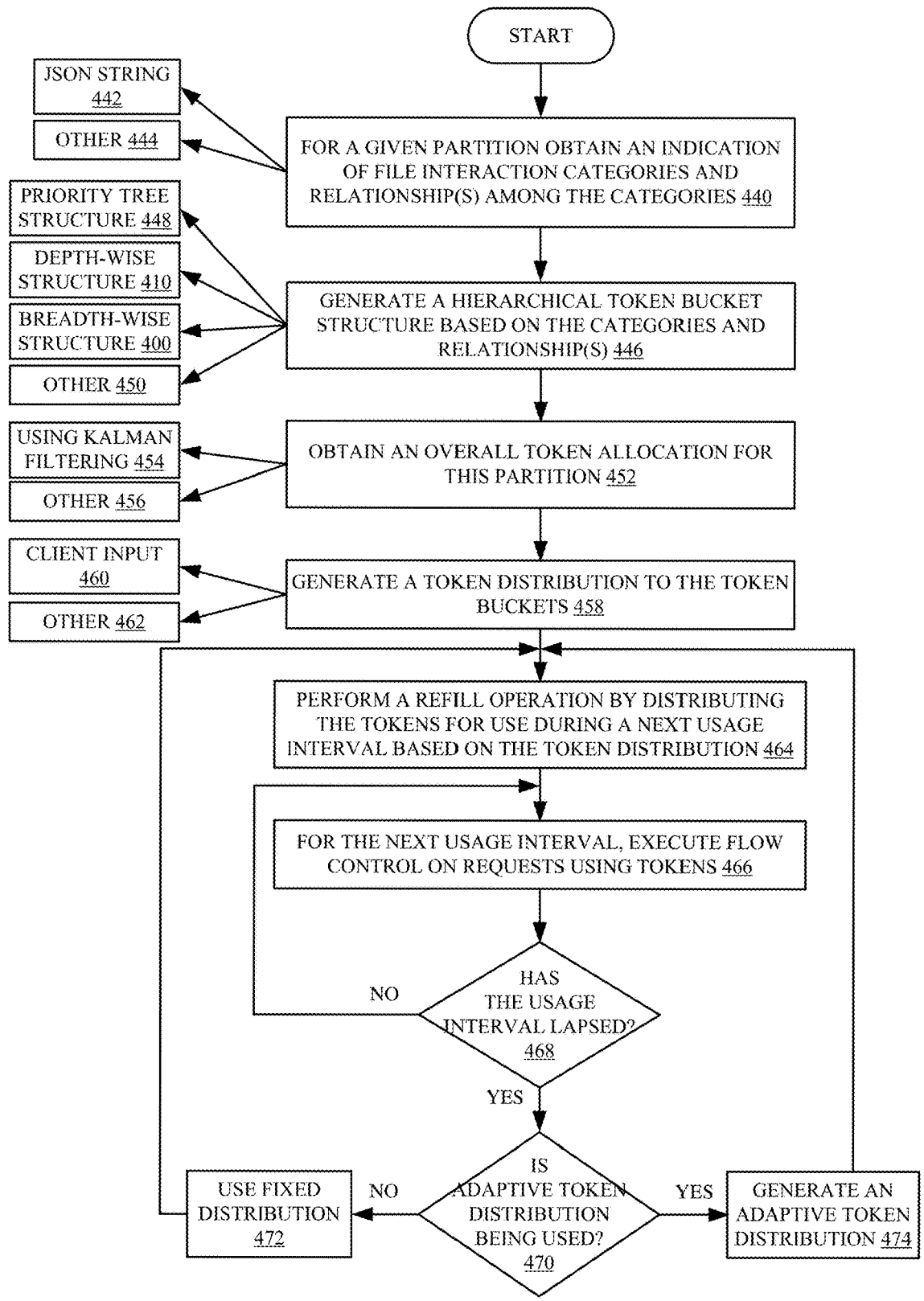
FIG. 8 is a flow diagram showing one example of a process of data flow in performing flow control.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. The operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

In the above discussions, it has been noted that not all of the file interactions that are indexed in the system-wide index 121 are the same. For instance, as noted above, the file interactions can include a user 101 creating a file, modifying a file, commenting on a file, reading a file, sharing a file, deleting a file, or otherwise accessing and interacting with a user file 110. It may be that some of these file interactions are more important to index, or have a higher priority, then other interactions. For instance, it may be more important that a file delete interaction is indexed more quickly than a file read interaction. Also, it may be that the lower priority interactions may be, at times, more voluminous than the higher priority interactions. Because there are a finite number of tokens assigned to each partition ID, there may arise instances where tokens are requested for lower priority file interactions at such as volume or frequency that the token requests for the lower priority file interactions starve tokens from token requests for higher priority interactions.

By way of example, if users 101 quickly read a large number of different files, then a token will be requested for each of those read interactions to index those read interactions in the system wide index 121. However, it may be that a file delete interaction is higher priority than a file read interaction. Yet, if tokens have been to index for so many read interactions that there are no remaining tokens to index the delete interaction, then the token request for the higher priority delete interaction will be denied, even though it is a higher priority interaction than the file interactions.

Therefore, in some examples of the present discussion, the different types of file interactions are grouped into categories. A token bucket is designated for each category and the available tokens for that partition ID are allocated among the different token buckets. Also, in some examples, the token buckets are arranged hierarchically relative to one another and if the tokens in a higher priority bucket are exhausted, tokens can be borrowed from a lower priority bucket to serve token requests that are made against the higher priority bucket. This helps to ensure that higher priority file interactions are indexed preferentially, relative to lower priority file interactions. Also, in some examples, the number of token requests per bucket is counted during each usage interval. Then, the distribution of tokens among the different token buckets can be reallocated based upon the number of token requests, per token bucket, in the prior usage interval. In this way, the token distribution among the token buckets can be rebalanced based upon token request traffic patterns.

Figure 5:
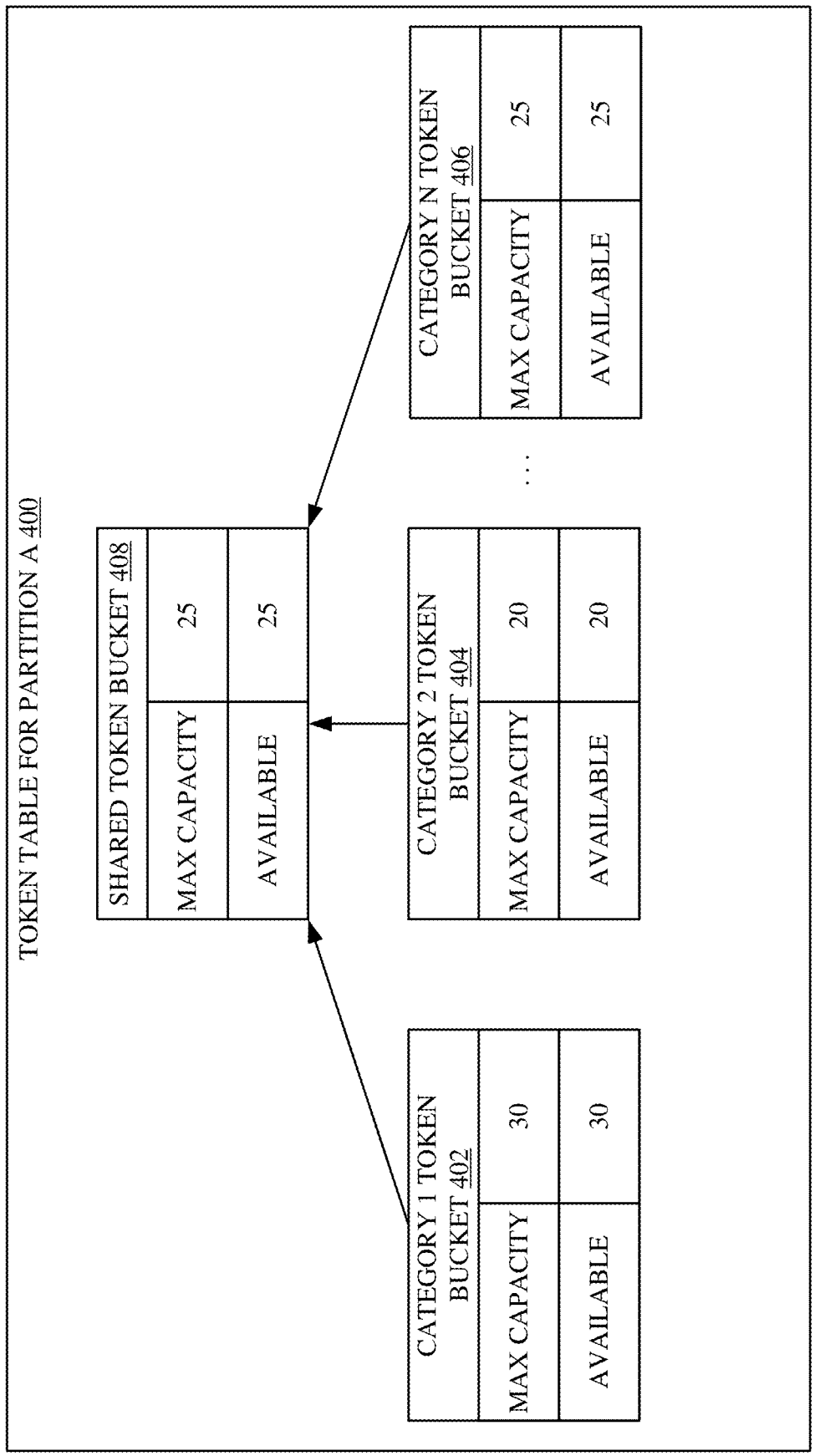
FIGS. 5 and 6 show examples of token bucket structures.

FIG. 5 shows one example of a hierarchical bucket structure 400 that can be used to express the relationship between various categories of file interactions. Structure 400 may be referred to as a breadth-wise token bucket structure and includes a category 1 token bucket 402, a category 2 token bucket 404, a category N token bucket 406, and a shared token bucket 408.

Thus, FIG. 5 shows that a different token bucket has been dedicated to each category of file interactions. Category 1 represents a first category of file interactions (such as file create interactions and file delete interactions). Category 2 represents a second category of file interactions (such as file modify interactions) and category N may represent yet a different category of file interactions (such as file read or file comment interactions, etc.). Each of the token buckets 402-406 has a maximum capacity indicator that indicates that maximum capacity of tokens that is assigned to that bucket, and an available token indicator indicating the remaining tokens that are available in that bucket, to service token requests in the present usage interval. So, for instance, the category 1 token bucket 402 has a maximum capacity of 30 tokens and shows that there are currently 30 available tokens. Category 2 token bucket 404 has a maximum capacity of 20 tokens and currently has 20 tokens available, and the category N token bucket 406 has a maximum capacity of 25 tokens and there are currently 25 tokens available.

Structure 400 also shows a hierarchical structure in which the token buckets 402, 404, and 406 are dependent from shared token bucket 408. Bucket 408 is the parent of child buckets 402, 404, and 406. Therefore, once all of the tokens in a child bucket 402, 404, or 406 are used (so that there are 0 available tokens in that child bucket), then a request for a token submitted against that child bucket may be served from any available tokens in shared token bucket 408. The tokens in bucket 408 are thus shared to serve token requests made against the different category token buckets 402-406.

By way of example, assume that all of the available tokens in category 1 token bucket 402 are used up so that there are no more tokens available in bucket 402. Assume also that a token request comes in for a category 1 file interaction. That token request will be directed against category 1 token bucket 402. Because there are no tokens available in the category 1 token bucket 402, a token can be obtained from the shared token bucket 408, and that token can be used to serve the token request against the category 1 token bucket 402. This prevents the indexing of the file interactions for a particular category of file interactions from being throttled as soon as the number of token requests exceeds the number of tokens assigned to the corresponding token bucket. Shared token bucket 408 thus provides a buffer for overflow requests made against the different category token buckets 402-406.

Figure 6:
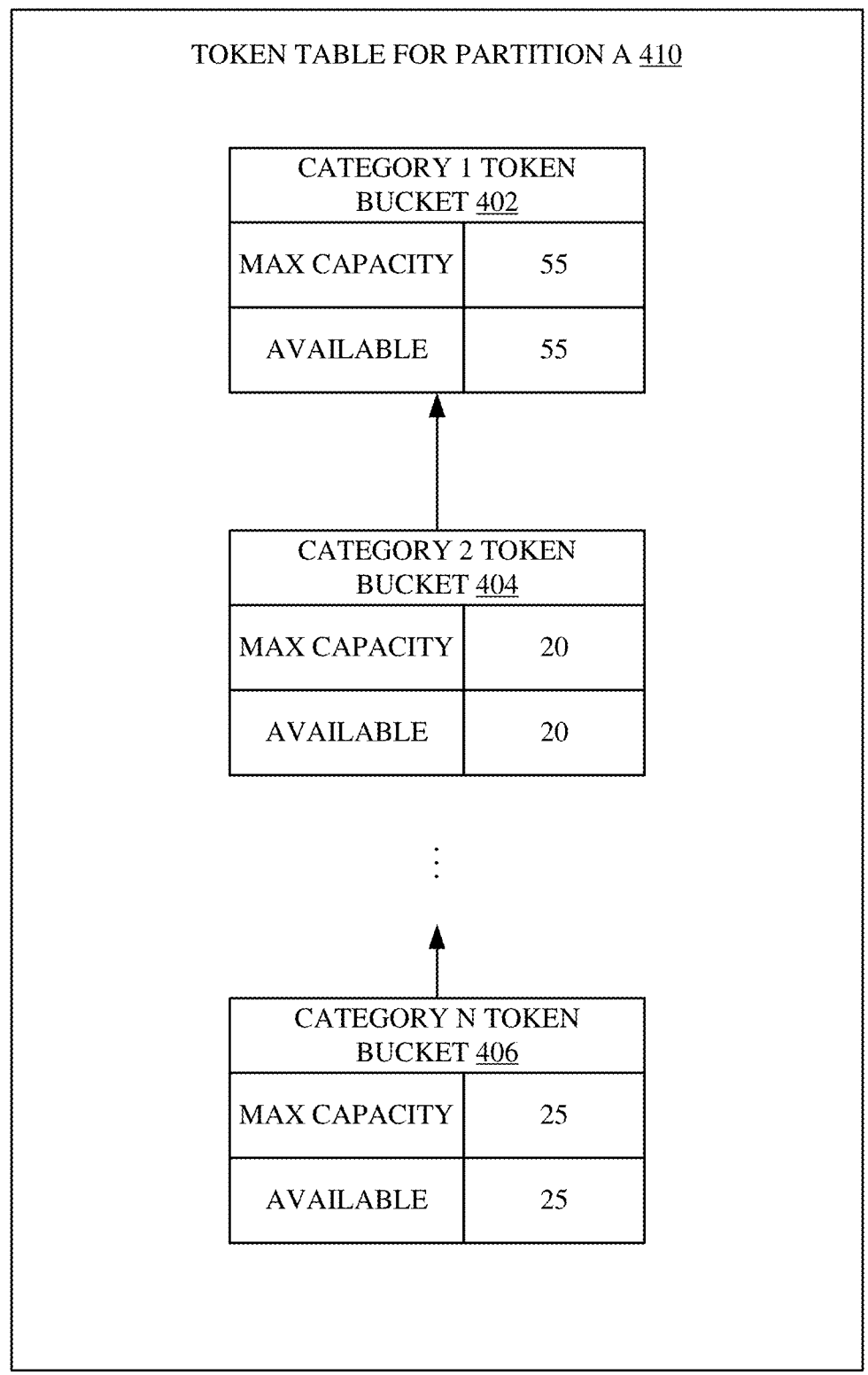

FIG. 6 shows the token buckets 402-406 arranged in a different bucket structure 410 that may be referred to as a depth-wise token bucket structure 410. In FIG. 6, category N token bucket 406 is ultimately dependent from category 2 token bucket 404, with any number of other token buckets intervening in the hierarchical token bucket structure 410. Category 2 token bucket 404 depends from category token 1 bucket 402. Category N token bucket 406 can thus obtain overflow tokens from any token buckets that are upstream of bucket 406 in the hierarchical structure 410. Therefore, assume that there are no available tokens left in category N token bucket 406 and a token request comes in against category N token bucket 406. In that case, a token can be obtained from the category 2 token bucket 404, if there are any available tokens in bucket 404. If no tokens are available in bucket 404, then bucket 406 can obtain a token from the category 1 token bucket 402, if any are available in bucket 402. Similarly, if category 2 token bucket 404 runs out of tokens, then token requests made against the category 2 token bucket 404 can be serviced from tokens remaining in the category 1 token bucket 402, but not from any available tokens remaining in the category N token bucket 406 because bucket 406 is downstream of bucket 404 in the hierarchical structure 410. In this way, the file interactions that are of highest priority may be categorized as category N file interactions. Therefore, token requests to index the highest priority file interactions will have the most available tokens because the tokens may be issued not only from bucket 406, but from all buckets upstream of bucket 406 in the hierarchical structure 410. File interactions that are of intermediate priority may be categorized into an intermediate level token bucket in hierarchical structure 410, and file interactions that are of low priority may be categorized into the category 1 token bucket 402.

Figure 7:
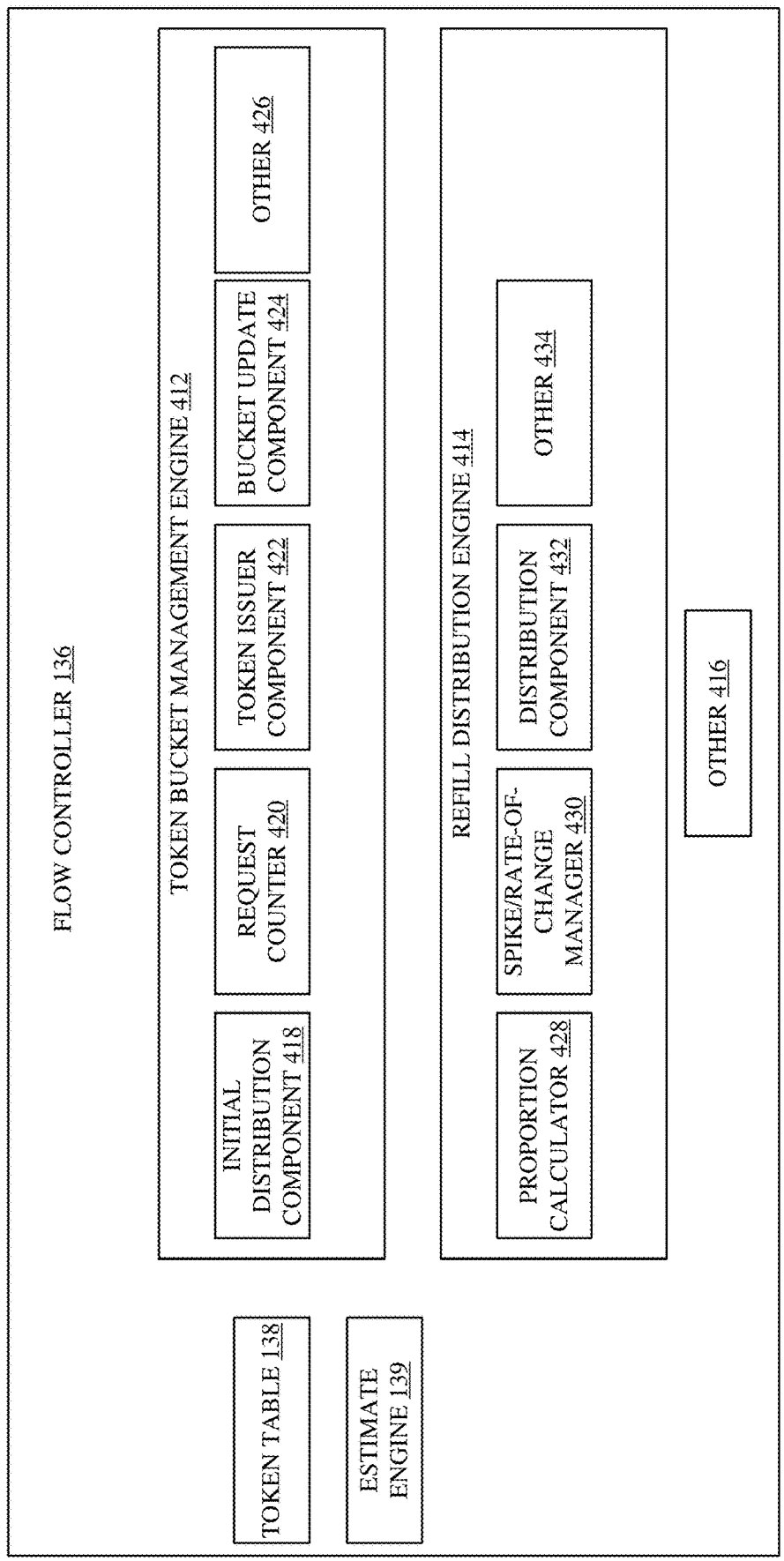
FIG. 7 is a block diagram showing one example of a flow controller.

FIG. 7 shows a block diagram illustrating one example of flow controller 136, in more detail. In FIG. 7, flow controller 136 may include (in addition to token table 138 and estimate engine 139) a token bucket management engine 412, a refill distribution engine 414, and other items 416. The token bucket management engine 412 may include initial distribution component 418, request counter 420, token issuer component 422, bucket update component 424, and other items 426. Refill distribution engine 414 can include proportion calculator 428, spike/rate-of-change manager 430, distribution component 432, and other items 434.

The initial distribution component 418 initially distributes tokens among the various token buckets in the hierarchal token structure (e.g., the buckets in structures 400 or 410). Request counter 420 counts the token requests that are made against each of the token buckets in the hierarchical structure during a usage interval, and token issuer component 422 issues tokens from each bucket. Bucket update component 424 updates the max capacity indicators and available indicators in each of the token buckets, as tokens are requested and issued from the buckets. Therefore, when a token is requested from a particular category token bucket, then request counter 420 increments the counter indicating that a token request has been received. Token issuer component 422 issues the token in response to the request, assuming there are available tokens left in the token bucket or in any upstream buckets, and bucket update component 424 decrements the available tokens indicator in the bucket to indicate that a token has been issued from that bucket.

Refill distribution engine 414 refills the tokens after each designated usage interval. To perform the refill operation, proportion calculator 428 obtains the number of token requests made against each bucket and calculates the proportion of the overall number of requests that were made against each token bucket in the token bucket structure. Spike/rate-of-change manager 430 ensures that the proportion of tokens assigned to each bucket does not fall below a minimum threshold or does not change too quickly, and the distribution component 432 then distributes the tokens for the next usage time interval based upon the proportion calculated by proportion calculator 428. Therefore, refill distribution engine 414 refills the tokens in each of the category token buckets 402-406 based upon the usage patterns observed in a prior usage time interval.

FIG. 8 is a flow diagram illustrating one example of the operation of flow controller 136 in generating the hierarchical token bucket structure that is to be used for managing tokens requested for a particular partition ID in the system wide index 121 and for managing that token structure during operation.

Token bucket management engine 412 first receives, for a given partition ID, an indication of the file interaction categories and the relationship among those categories, as indicated by block 440. In one example, the categories and relationship among those categories can be designated in a JSON string 442 that has passed in by a client computing system 102, or that is passed in by any of the other systems, as indicated by block 444. The token bucket management engine 412 then generates a representation of a token bucket structure based upon the identified categories and the relationship among those categories. Generating the token bucket structure is indicated by block 446 in the flow diagram of FIG. 8. The bucket structure may be configured in one or more tables, in a spreadsheet, or in other ways. The bucket structure is arranged to indicate a priority among the different categories, as indicated by block 448. The bucket structure may be a depth-wise bucket structure 410, as shown in FIG. 6, or a breadth-wise bucket structure 400, as shown in FIG. 5. The bucket structure can be any of a wide variety of other bucket structures 450 as well.

Initial distribution component 418 then obtains an overall token allocation for this particular partition ID. This may be the output of the Kalman filter used by estimation engine 139, or it may be obtained in other ways. Obtaining an overall token allocation for this partition ID is indicated by block 452 in the flow diagram of FIG. 8. Obtaining that token allocation using Kalman filtering is indicated by block 454, and obtaining it in other ways is indicated by block 456.

Initial distribution component 418 then generates an initial token distribution to distribute the overall number of tokens among the different category token buckets in the bucket structure. Generating the initial token distribution is indicated by block 458. The initial token distribution can be input from a client computing system, as indicated by block 460, or obtained empirically, or in other ways, as indicated by block 462. Initial distribution component 418 then performs a refill operation by distributing the tokens for use during the next usage interval based upon the token distribution. Distributing the tokens in this way is indicated by block 464. An example may be helpful.

TABLE 1

TOKEN DISTRIBUTION

| Category | Proportion | Token Distribution |
|---|---|---|
| A | 50% | 50 |
| B | 30% | 30 |
| C | 20% | 20 |
| Total | 100% | 100 |

Table 1 shows one example in which there are three different category token buckets (one for category A, one for category B, and one for category C). The initial token distribution shows that 50% of the overall tokens should be distributed to the category A token bucket, while 30% should be distributed to the category B token bucket, and 20% should be distributed to the category C token bucket. Assume that the overall token allocation is 100 tokens, this means that the token distribution to the category A token bucket will be 50 tokens. The distribution to the category B token bucket will be 30 tokens, and the distribution to the category C token bucket will be 20 tokens.

Once the tokens are distributed among the different category token buckets in the bucket structure, then token bucket management engine 412 executes flow control on the token requests for a usage time interval, as indicated by block 466. Therefore, during that usage time interval, request counter 420 counts the number of token requests made against each category token bucket, token issuer component 422 issues tokens so long as there are any remaining, and bucket update component 424 updates the number of available tokens indicated for each of the token buckets, as tokens are issued from those buckets. This operation continues until the usage interval has lapsed, as indicated by block 468. Performing flow control is described in greater detail below with respect to FIG. 9. As discussed above, as long as a token is available in a token bucket against which a request is made (or a token is available from any buckets higher up in the hierarchical structure) a token is issued and the available token indicators are updated. However, when no tokens are available to service the token request, then the token request is denied and the system can retry or otherwise process the denial.

Once the usage interval has lapsed, then refill distribution engine 414 refills the token buckets in the bucket structure in one of a number of different ways, such as using a fixed token distribution or an adaptive token distribution. Determining whether the refill operation is to use a fixed distribution or an adaptive distribution is indicated by block 470 in the flow diagram of FIG. 8. Refilling the token buckets using a fixed distribution is indicated by block 472, and refilling the token buckets using an adaptive distribution is indicated by block 474. For instance, where the token distribution among the various category token buckets is fixed, then refill distribution engine 414 simply refills each of the category token buckets to its original fixed percentage or fixed number of tokens. By way of example, referring again to Table 1, if the token distribution is fixed, then at the end of each time interval, the category A token bucket will be refilled with 50 tokens, the category B token bucket will be refilled with 30 tokens, and the category C token bucket will be refilled with 20 tokens.

If an adaptive token distribution is to be used, then proportion calculator 428 calculates the proportion of token requests that were received in each token bucket and distribution component 432 distributes that proportion of the overall available tokens to each token bucket, with the caveat that spike/rate-of-change manager 430 ensures that the number of tokens is not too low or that the rate of change in the number of tokens is not too high. Generating an adaptive token distribution is indicated by block 474 in the flow diagram of FIG. 8 and is described in greater detail below with respect to FIG. 10.

Figure 9:
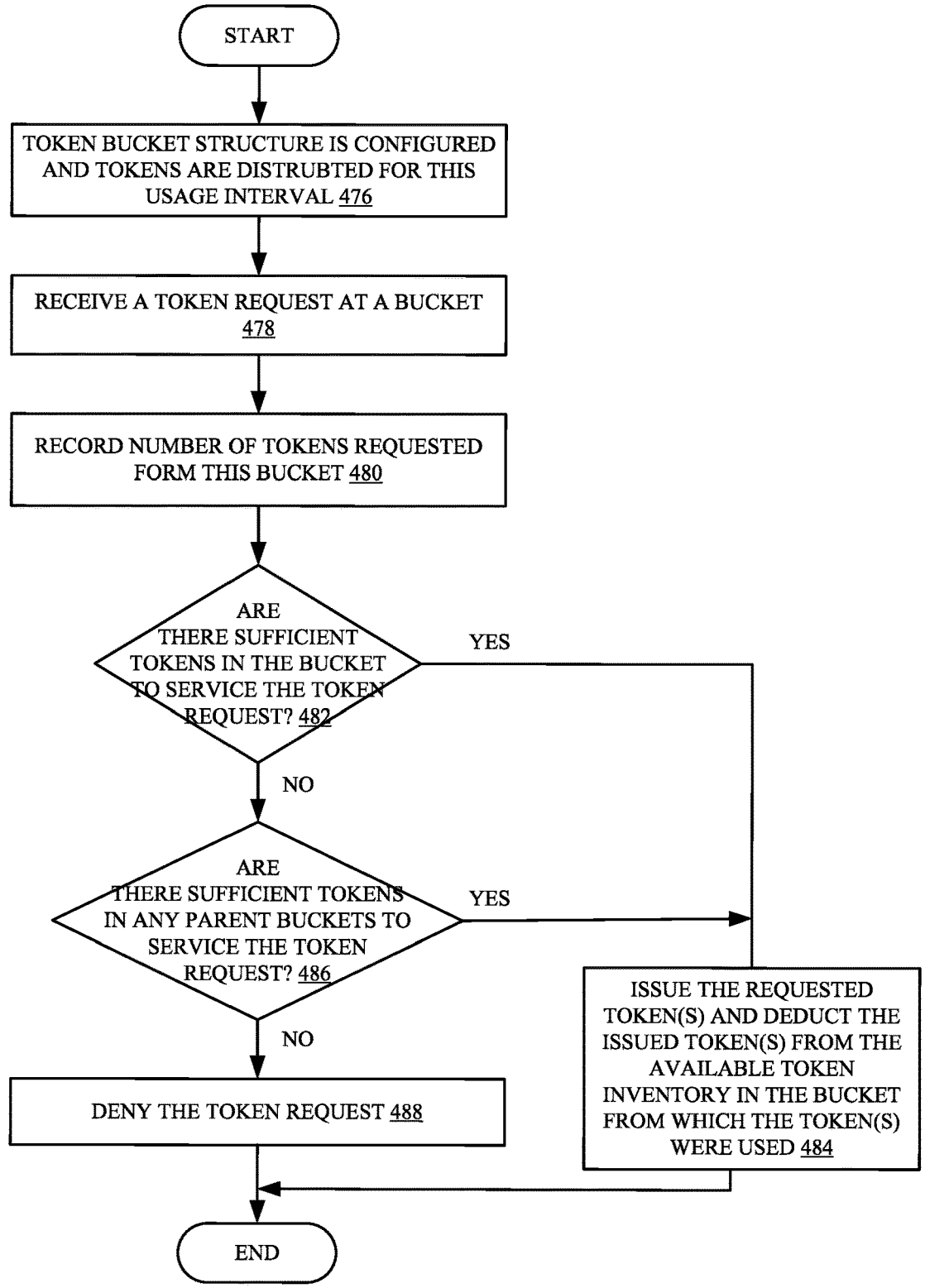
FIG. 9 is a flow diagram showing one example of a process of data flow in servicing token requests.

FIG. 9 is a flow diagram illustrating the operation of flow controller 136 in performing flow control during a usage interval. It is first assumed that initial distribution component 418 generates the token bucket structure and configures that token bucket structure as defined by a client computing system or in other ways. Initial distribution component 418 then distributes the tokens, for this usage interval. The tokens can be distributed according to an initial proportion as shown in Table 1, for instance, or in other ways. Configuring the token bucket structure and distributing the tokens to the different buckets in that token bucket structure is indicated by block 476 in the flow diagram of FIG. 9.

The token bucket management engine 412 then receives a token request at one of the buckets, as indicated by block 478. For instance, flow controller 136 identifies the particular category of file interaction for which the token is requested, to identify the particular bucket against which the token request is to be executed. Request counter 420 then increments the number of tokens requested from this particular bucket, as indicated by block 480. Token issuer component 422 then determines whether there are sufficient available tokens in the token bucket to service the token request. For instance, assume that the token request is being executed against token bucket 406 in FIG. 6. Assume also that the token request is for 20 tokens. Token issuer component 422 examines the available token indicator to determine that there are 25 available tokens in token bucket 406, so that the token request can be serviced from the available tokens in token bucket 406. Determining whether there are sufficient tokens in the token bucket to service the token request is indicated by block 482 in the flow diagram of FIG. 9. If so, then token issuer component 422 issues the requested tokens, and bucket update component 424 updates the available token indicator in the token bucket by deducting the number of issued tokens from the token inventory (e.g., the available tokens) in the bucket from which the tokens were issued. Issuing the requested tokens and updating the available tokens in the bucket is indicated by block 484 in the flow diagram of FIG. 9.

If, at block 482, token issuer component 422 determines that there are not sufficient available tokens to service the token request, then token issuer component 424 traverses the token bucket structure through one or more parent token buckets to determine whether any of the parent buckets, alone or in conjunction with other buckets up the chain of hierarchy, have a sufficient number of available tokens to service the token request. For example, assuming that token bucket 406 in FIG. 6 has an insufficient number of available tokens to service the token request, then token issuer component 422 traverses the token bucket structure 410 upwardly to determine whether any of the parent token buckets (either alone or in combination with bucket 406 and any intervening buckets) have sufficient available tokens to service the token request. Determining whether there are sufficient tokens in any of the parent buckets in the bucket structure is indicated by block 486 in the flow diagram of FIG. 9. If so, again processing continues at block 484 where token issuer component 422 issues the requested tokens and bucket update component 424 updates the available token indicator in the buckets from which the tokens were issued.

However, if, at block 486 in the flow diagram of FIG. 9, token issuer component 422 determines that there is not a sufficient number of tokens in any of the parent buckets (alone or in combination), then token issuer component 422 denies the token request, as indicated by block 488 in the flow diagram of FIG. 9. As discussed above, the denial can be processed by the content service 132 and/or item processor 134 as described above with respect to FIG. 2B.

Figure 10:
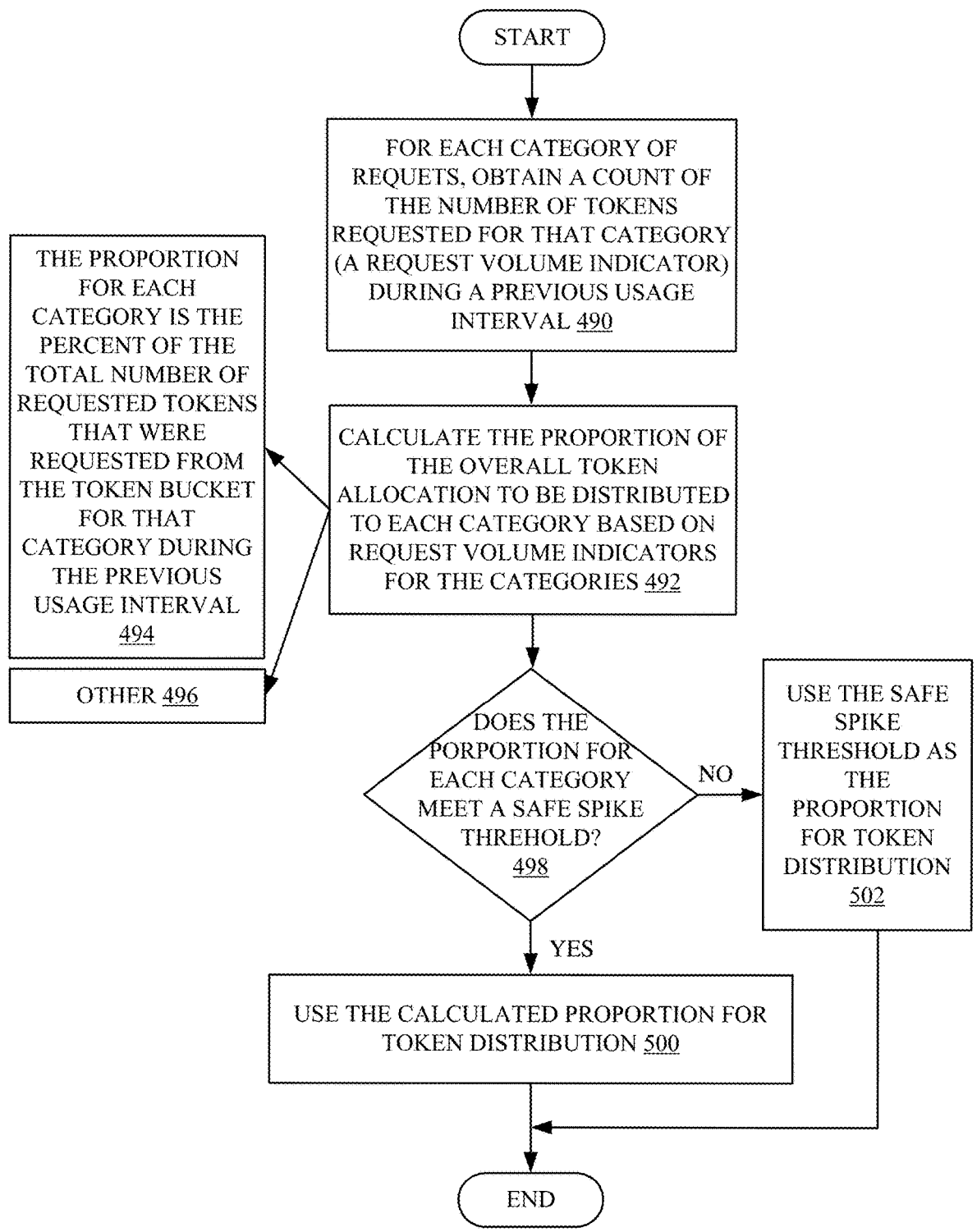
FIG. 10 is a flow diagram showing one example of a process of data flow in refilling token buckets.

FIG. 10 is a flow diagram illustrating one example of the operation of refill distribution engine 414 in calculating the proportion of requested tokens that are received during a previous usage interval by each of the buckets in a token bucket structure, and distributing tokens to the token buckets in that token bucket structure to refill the token buckets in the token bucket structure. Proportion calculator 428 first obtains the count of the number of token requests generated against (received by) each of the token buckets in the token bucket structure during the previous usage interval. The previous usage interval may be a time interval, an interval of traffic volume in terms of the number of token requests, or an interval measured in other ways. Obtaining these counts is indicated by block 490 in the flow diagram of FIG. 10.

Proportion calculator 428 then calculates the proportion of the overall token allocation that is to be distributed to each token bucket (for each category) based upon the request counts, for each category. Calculating the proportion is indicated by block 492 in the flow diagram of FIG. 10. In one example, the proportion for each category is calculated by determining what percent of the total number of requested tokens (that were requested from the token bucket structure) were received by the token bucket for that category during the previous usage interval. Calculating the proportion in this way is indicated by block 494. The proportions can be calculated in other ways as well, as indicated by block 496.

It may happen during some time interval that one or more of the categories of file interactions has a large spike in traffic. This would lead to a large spike in token requests directed against the token bucket corresponding to that category of file interaction. For instance, it may be that a large number of users read a file and a relatively small number of users create new files or delete files during a particular usage interval. In that case, the number of token requests against the token bucket for the category of file interactions containing the read file interaction may far exceed the number of tokens requested against a token bucket for file interaction categories containing the create file and delete file interactions. Therefore, during the next refill operation the proportion of tokens to be refilled into the token bucket for the category containing the read file interaction may be a very high percentage, while the proportion of tokens to be refilled into the token bucket for the categories containing the create and delete file interactions is very low. If the traffic spike is high enough, then the proportions for each category may be undesirably skewed in favor of the token bucket corresponding to the read file interactions, simply based on the traffic spike. Therefore, in one example, a safe spike threshold value is set to alleviate such a situation. An example may be helpful.

TABLE 2

REFILL TOKEN DISTRIBUTION

| Category | Observed Token Demand | Calculated Proportion | Meet Safe Spike Threshold? | Token Distribution |
|---|---|---|---|---|
| A | 68 | 68% | Y | 68 |
| B | 20 | 20% | Y | 20 |
| C | 12 | 12% | Y | 12 |
| Total | 100 | 100% | | 100 |

Table 2 shows one example of a refill token distribution operation. It can be seen in Table 2 that there are three file interaction categories for which a token bucket exists. Those categories include category A, category B, and category C. The second column in Table 2 shows the number of token requests received by each token bucket during the previous usage interval. Table 2 shows that the category A token bucket received 68 token requests while the category B token bucket received 20 token requests and the category C token bucket received 12 token requests. Thus, the calculated proportion of token requests received at each token bucket is 68% for the token bucket corresponding to category A, 20% for the token bucket corresponding to category B, and 12% for the token bucket corresponding to category C. Assume that the safe spike threshold is set to 10%, meaning that the proportion of tokens distributed to any of the token buckets must not drop below 10% of the overall number of tokens to be distributed across the token bucket structure. Then, Table 2 shows that all three of the calculated proportions meet that threshold so that the overall number of tokens distributed to each of the token buckets (assuming that there are 100 tokens to be distributed) matches the calculated proportions. Therefore, 68 tokens are distributed the token bucket corresponding to category A, 20 tokens are distributed to the token bucket corresponding to category B, and 12 tokens are distributed to the token bucket corresponding to category C.

TABLE 3

REFILL TOKEN DISTRIBUTION

| Category | Observed Token Demand | Calculated Proportion | Meet Safe Spike Threshold? | Token Distribution |
|---|---|---|---|---|
| A | 88 | 88% | Y | 88 |
| B | 11 | 11% | Y | 11 |
| C | 1 | 1% | N | 10 |
| Total | 100 | 100% | | 108 |

Table 3 shows an example in which the traffic for category A file interactions spiked to 88% of the overall token request traffic. In the example shown in Table 3, it can be seen that the token requests against the token bucket corresponding to category A file interactions were 88, while the token requests against the token bucket corresponding to category B file interactions were 11 and the token requests against the token bucket corresponding to category C file interactions were 1. In that case, the calculated proportions for the three categories are 88%, 11%, and 1%, respectively. Again, assuming that the safe spike threshold is set to 10%, then the calculated proportion for the category A token bucket meets the safe spike threshold, as does the calculated proportion for the category B token bucket. However, the calculated proportion for the category C token bucket does not meet the safe spike threshold. Therefore, while the total number of tokens distributed to the category A and category B token buckets matches their calculated proportion, the total number of tokens distributed to the category C token bucket is set to the safe spike threshold (10%), instead of to the calculated proportion. Thus, instead of only distributing one token to the category C token bucket (because its calculated proportion during the last usage interval was 1%) the actual number of tokens distributed to the category C token bucket is 10 (corresponding to the safe spike threshold value).

Returning again to the flow diagram of FIG. 10, after proportion calculator 428 calculates the proportion of token requests received at each token bucket, then spike/rate-of-change manager 430 determines whether the calculated proportion for each category meets the safe spike threshold, as indicated by block 498 in the flow diagram of FIG. 10. If so, then this is similar to the scenario shown and discussed above with respect to Table 2 and distribution component 432 distributes tokens to the various token buckets in the token bucket structure using the calculated proportion, as indicated by block 500. However, if, at block 498, the calculated proportion for one or more of the token buckets does not meet the safe spike threshold, then distribution component 432 distributes the tokens using the safe spike threshold as the proportion for token distribution, instead of the calculated proportion, as indicated by block 502. One example of distributing the tokens in this way corresponds to the distribution shown in the example illustrated above with respect to Table 3.

It should also be noted that traffic spikes can be handled in other ways as well. For example, instead of setting a safe spike threshold value, a rate-of-change threshold value may be set. The proportion of tokens distributed to a particular token bucket may, in that case, not be allowed to change more than a rate-of-change threshold value. By way of example, assume that a token bucket has a proportion of 30% during a particular usage interval. However, during that usage interval, assume that the proportion of token requests for that token bucket dropped to 5%. Assume further that a rate-of-change threshold value is set to 50% meaning that, from one usage interval to the next, the calculated proportion for a token bucket may not change more than 50%. In that case, because the original proportion for the token bucket was set to 30%, the new proportion for that token bucket will be set to 15% (a 50% reduction) rather than to 5% (which was indicated based on the token request traffic during the previous usage interval). These and other examples are contemplated herein.

It can thus be seen that the present description allows a tenant (or other entity) to prioritize or otherwise categorize the different types of file interactions and the number of tokens available during flow control can be set for each of those categories. In one example, the categories are each represented by a token bucket and the token buckets can be arranged in one of a number of different structures. The token bucket structure can thus facilitate a fixed distribution of tokens to the different categories or an adaptive distribution. With a fixed distribution, the number of tokens distributed to each token bucket during each usage interval is fixed. During an adaptive distribution, the number of tokens distributed to each token bucket during each usage interval is adapted based upon token request traffic patterns during one or more previous usage intervals. Similarly, the tokens can be arranged in a bucket structure that allows higher priority token buckets to borrow tokens from other lower priority token buckets. The token buckets can borrow tokens from a shared overflow token bucket, or from a token bucket corresponding to a lower priority file interaction.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which the processors and servers belong and are activated by, and facilitate the functionality of the other components or items in those systems.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It should also be noted that the different examples described herein can be combined in different ways. That is, parts of one or more examples can be combined with parts of one or more other examples. All of this is contemplated herein.

Example 1 is a computer implemented method, comprising:

receiving a token request at a token issuer component, the token request requesting a token representing permission to record a file interaction in an index, the file interaction being of a first type of file interaction belonging to a first category of file interactions;

accessing a portion of a token bucket structure of token buckets based on the first category of file interactions to determine whether there are enough tokens available to service the token request, each token bucket in the token bucket structure corresponding to a different category of file interactions and having a number of available tokens; and generating an output based on whether there enough available tokens to service the token request.

Example 2 is the computer implemented method of any or all previous examples wherein generating an output comprises:

if there are enough tokens available to service the token request, issuing a number of tokens to serve the token request; and if there are insufficient available tokens to service the token request, generating an output denying the token request.

Example 3 is the computer implemented method of any or all previous examples and further comprising:

detecting refill criteria indicating that a refill operation is to be performed; and distributing a number of tokens to each token bucket in the token bucket structure based on an overall number of tokens allocated to the token bucket structure.

Example 4 is the computer implemented method of any or all previous examples wherein distributing a number of tokens to each of the token buckets in the token bucket structure comprises:

distributing a number of tokens to each of the token buckets in the token bucket structure based on a number of token requests received for each token bucket in the token bucket structure during the previous time interval.

Example 5 is the computer implemented method of any or all previous examples wherein distributing a number of tokens to each of the token buckets in the token bucket structure based on a number of token requests received for each token bucket in the token bucket structure during the previous time interval, comprises:

for each token bucket, calculating a proportion of an overall number of token requests received for that token bucket during the previous time interval; and distributing a particular number of tokens to each token bucket in the token bucket structure based on the calculated proportion of the overall number of token requests received for each token bucket.

Example 6 is the computer implemented method of any or all previous examples wherein distributing a number of tokens to each token bucket comprises:

for each selected token bucket, identifying a proportion of the overall number of tokens to be distributed to the selected token bucket; and distributing the identified proportion of the overall number of tokens to the selected token bucket.

Example 7 is the computer implemented method of any or all previous examples wherein identifying a proportion of the overall number of tokens to be distributed to the selected token bucket comprises:

identifying an overall number of token requests received by the token buckets during the previous time interval; and for each token bucket in the token bucket structure:

identifying a particular number of token requests received for that token bucket during the previous time interval;

calculating a particular proportion of received token requests for the selected token bucket as the proportion of the overall number of token requests comprised by the particular number of token requests; and identifying the proportion of the overall number of tokens to be distributed to the selected token bucket based on the particular proportion of received token requests.

Example 8 is the computer implemented method of any or all previous examples wherein the token bucket structure includes a hierarchical token bucket structure having a parent token bucket and a child token bucket and wherein accessing a portion of the token bucket structure comprises:

accessing a portion of the hierarchical token bucket structure.

Example 9 is the computer implemented method of any or all previous examples wherein accessing a portion of the hierarchical token bucket structure comprises:

accessing the child token bucket that comprises a first category token bucket in the hierarchical token bucket structure, corresponding to the first category of file interactions, to determine whether there are enough tokens available to service the token request; and if not, accessing the parent token bucket, that is a parent of the first category token bucket, to determine whether there are enough tokens available to service the token request.

Example 10 is the computer implemented method of any or all previous examples wherein the parent token bucket comprises a shared token bucket that is shared by a plurality of child token buckets.

Example 11 is a computer implemented method, comprising:

receiving a token request at a token issuer component, the token request requesting a token representing permission to record a file interaction in an index, the file interaction being of a first type of file interaction belonging to a first category of file interactions;

accessing a portion of a token bucket structure of token buckets based on the first category of file interactions to determine whether there are enough tokens available to service the token request, each token bucket in the token bucket structure corresponding to a different category of file interactions and having a number of available tokens;

if there are enough tokens available to service the token request, issuing a number of tokens to serve the token request; and decrementing a number of available tokens in the portion of the token bucket structure based on the number of tokens issued to serve the token request.

Example 12 is the computer implemented method of any or all previous examples and further comprising:

identifying refill criteria indicating that tokens are to be added to the token buckets; and performing a refill operation to add tokens to the token buckets.

Example 13 is the computer implemented method of any or all previous examples wherein performing a refill operation comprises:

for each token bucket, adding a predefined quantity of tokens to the token bucket.

Example 14 is the computer implemented method of any or all previous examples wherein performing a refill operation comprises:

counting a number of token requests received for each token bucket in the token bucket structure during a previous time interval; and distributing a number of tokens to each of the token buckets in the token bucket structure based on the number of token requests received for each token bucket in the token bucket structure during the previous time interval.

Example 15 is the computer implemented method of any or all previous examples wherein the token bucket structure includes a hierarchical token bucket structure having a parent token bucket and a child token bucket and wherein accessing a portion of the token bucket structure comprises:

accessing a portion of the hierarchical token bucket structure.

Example 17 is the computer implemented method of any or all previous examples wherein the child token bucket comprises a first category token bucket corresponding to the first category of file interactions and wherein accessing a portion of the hierarchical token bucket structure comprises:
accessing the child token bucket to determine whether there are enough tokens available to service the token request; and
if not, accessing the parent token bucket to determine whether there are enough tokens available to service the token request.

Example 18 is the computer implemented method of any or all previous examples wherein the parent token bucket comprises a shared token bucket that is shared by a plurality of child token buckets.

Example 19 is a computer system, comprising:
at least one processor;
a data store storing instructions which, when executed by the at least one processor cause the at least one processor to perform steps, comprising:
receiving a token request at a token issuer component, the token request requesting a token representing permission to record a file interaction in an index, the file interaction being of a first type of file interaction belonging to a first category of file interactions;
accessing a portion of a token bucket structure of token buckets based on the first category of file interactions to determine whether there are enough tokens available to service the token request, each token bucket in the token bucket structure corresponding to a different category of file interactions and having a number of available tokens;
if there are enough tokens available to service the token request, issuing a number of tokens to serve the token request; and
decrementing a number of available tokens in the portion of the token bucket structure based on the number of tokens issued to serve the token request.

Example 20 is the computer system of any or all previous examples wherein the computer executable instructions cause the at least one processor to perform steps further comprising:
identifying refill criteria indicating that tokens are to be added to the token buckets; and
performing a refill operation to add tokens to the token buckets.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
receiving, at a token issuer component, a token request that corresponds to a token requestor and requests a token representing permission to record a file interaction in an index;
identifying a particular category of file interaction for which the token is requested;
accessing a portion of a token bucket structure of token buckets based on the particular category of file interactions, the token bucket structure including:
a first token bucket corresponding to a first type of file interaction belonging to a first category of file interactions, the first token bucket having a first number of available tokens, and
a second token bucket corresponding to a second type of file interaction belonging to a second category of file interactions, the second type of file interaction being different than the first type of file interaction, and the second token bucket having a second number of available tokens; and
based on determining that there are enough available tokens, in one of the first token bucket or the second token bucket corresponding to the particular category of file interactions, to service the token request, providing the token to the token requestor.

2. The computer implemented method of claim 1, and further comprising:
receiving a second token request that requests a second token;
identifying a second particular category of file interaction for which the second token is requested;
based on determining that there are insufficient available tokens, in one of the first token bucket or the second token bucket corresponding to the second particular category of file interactions, to service the second token request, generating an output denying the second token request.

3. The computer implemented method of claim 1 and further comprising:
detecting refill criteria indicating that a refill operation is to be performed; and
distributing a number of tokens to each token bucket in the token bucket structure based on an overall number of tokens allocated to the token bucket structure.

4. The computer implemented method of claim 3 wherein distributing a number of tokens to each token bucket in the token bucket structure comprises:
distributing a number of tokens to each token bucket in the token bucket structure based on a number of token requests received for each token bucket in the token bucket structure during a previous time interval.

5. The computer implemented method of claim 1, and further comprising:
for each given token bucket of one or more token buckets in the token bucket structure,
calculating a proportion of an overall number of token requests received for the given token bucket during a previous time interval; and
distributing a particular number of tokens to the given token bucket in the token bucket structure based on the proportion of the overall number of token requests received for the given token bucket.

6. The computer implemented method of claim 1, and further comprising:
for each given token bucket of one or more token buckets in the token bucket structure,
identifying a proportion of an overall number of tokens to be distributed to the given token bucket; and
distributing the proportion of the overall number of tokens to the given token bucket.

7. The computer implemented method of claim 6 wherein identifying a proportion of the overall number of tokens to be distributed to the given token bucket comprises:
identifying an overall number of token requests received by the token buckets during a previous time interval; and
for each respective token bucket in the token bucket structure:
identifying a particular number of token requests received for the respective token bucket during the previous time interval;

calculating a particular proportion of received token requests for the given token bucket as the proportion of the overall number of token requests comprised by the particular number of token requests; and identifying the proportion of the overall number of tokens to be distributed to the given token bucket based on the particular proportion of received token requests.

8. The computer implemented method of claim 1 wherein the token bucket structure includes a hierarchical token bucket structure having a parent token bucket and a child token bucket and wherein accessing a portion of the token bucket structure comprises:

accessing a portion of the hierarchical token bucket structure.

9. The computer implemented method of claim 8 wherein accessing a portion of the hierarchical token bucket structure comprises:

accessing the child token bucket that comprises a first category token bucket in the hierarchical token bucket structure, corresponding to the first category of file interactions, to determine whether there are enough tokens available to service the token request; and based on determining there are not enough tokens available to service the token request, accessing the parent token bucket, that is a parent of the first category token bucket, to determine whether there are enough tokens available to service the token request.

10. The computer implemented method of claim 9 wherein the parent token bucket comprises a shared token bucket that is shared by a plurality of child token buckets.

11. A computer implemented method, comprising:

receiving a token request at a token issuer component, the token request requesting a token representing permission to record a file interaction in an index, the file interaction being of a first type of file interaction belonging to a first category of file interactions;

accessing a portion of a token bucket structure of token buckets based on the first category of file interactions to determine whether there are enough tokens available to service the token request, each token bucket in the token bucket structure corresponding to a different category of file interactions and having a number of available tokens;

if there are enough tokens available to service the token request, issuing a number of tokens to serve the token request;

decrementing a number of available tokens in the portion of the token bucket structure based on the number of tokens issued to serve the token request;

identifying refill criteria indicating that tokens are to be added to one or more token buckets in the token bucket structure; and performing a refill operation comprising:

counting a number of token requests received for each token bucket in the token bucket structure during a previous time interval; and distributing a number of tokens to the one or more token buckets in the token bucket structure based on the number of token requests received for each token bucket in the token bucket structure during the previous time interval.

12. The computer implemented method of claim 11 wherein performing a refill operation comprises:

for each token bucket, adding a predefined quantity of tokens to the token bucket.

13. The computer implemented method of claim 11 wherein the token bucket structure includes a hierarchical token bucket structure having a parent token bucket and a child token bucket and wherein accessing a portion of the token bucket structure comprises:

accessing a portion of the hierarchical token bucket structure.

14. The computer implemented method of claim 13 wherein the child token bucket comprises a first category token bucket corresponding to the first category of file interactions and wherein accessing a portion of the hierarchical token bucket structure comprises:

accessing the child token bucket to determine whether there are enough tokens available to service the token request; and if not, accessing the parent token bucket to determine whether there are enough tokens available to service the token request.

15. The computer implemented method of claim 13 wherein the parent token bucket comprises a shared token bucket that is shared by a plurality of child token buckets.

16. A computer system, comprising:

at least one processor; and a data store storing instructions which, when executed by the at least one processor cause the at least one processor to perform steps, comprising:

receiving, at a token issuer component, a token request that corresponds to a token requestor and requests a token representing permission to record a file interaction in an index;

identifying a particular category of file interaction for which the token is requested;

accessing a portion of a token bucket structure of token buckets based on the particular category of file interactions, the token bucket structure including:

a first token bucket corresponding to a first type of file interaction belonging to a first category of file interactions, the first token bucket having a first number of available tokens, and a second token bucket corresponding to a second type of file interaction belonging to a second category of file interactions, the second type of file interaction being different than the first type of file interaction, and the second token bucket having a second number of available tokens;

based on determining that there are enough tokens, in one of the first token bucket or the second token bucket corresponding to the particular category of file interactions, available to service the token request, issuing a number of tokens to serve the token request; and decrementing a number of available tokens in the portion of the token bucket structure based on the number of tokens issued to serve the token request.

17. The computer system of claim 16 wherein the instructions cause the at least one processor to perform steps further comprising:

identifying refill criteria indicating that tokens are to be added to one or more token buckets in the token bucket structure; and performing a refill operation to add tokens to the one or more token buckets.

18. The computer system of claim 16 wherein the instructions cause the at least one processor to perform steps further comprising:

counting a number of token requests received for each token bucket in the token bucket structure during a previous time interval; and distributing a number of tokens to one or more token buckets in the token bucket structure based on the number of token requests received for the one or more token buckets during the previous time interval.

19. The computer system of claim 16 wherein the token bucket structure includes a hierarchical token bucket structure having a parent token bucket and a child token bucket and wherein accessing a portion of the token bucket structure comprises:

accessing a portion of the hierarchical token bucket structure.

20. The computer system of claim 19 wherein the child token bucket comprises a first category token bucket corresponding to the first category of file interactions and wherein accessing a portion of the hierarchical token bucket structure comprises:

based on determining that there are not enough tokens in the child token bucket available to service the token request, accessing the parent token bucket to determine whether there are enough tokens available to service the token request.

* * * * *